United States Patent
Ishikawa et al.

(10) Patent No.: US 6,364,446 B1
(45) Date of Patent: Apr. 2, 2002

(54) PRINTING METHOD AND PRINTING APPARATUS

(75) Inventors: Hisashi Ishikawa, Urayasu; Hiroshi Tajika, Yokohama; Yuji Konno, Kawasaki; Hiroo Inoue, Kawasaki; Norihiro Kawatoko, Kawasaki; Tetsuya Edamura, Tama; Tetsuhiro Maeda, Kawasaki, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/588,177

(22) Filed: Jun. 7, 2000

(30) Foreign Application Priority Data

Jun. 7, 1999 (JP) .......................... 11-159847
Oct. 15, 1999 (JP) .......................... 11-294342

(51) Int. Cl.$^7$ ................. B41J 2/205; B41J 29/38
(52) U.S. Cl. ..................................... 347/15; 347/16
(58) Field of Search ..................... 347/15, 16, 19; 358/461, 517

(56) References Cited

U.S. PATENT DOCUMENTS

| | | | |
|---|---|---|---|
| 4,313,124 A | 1/1982 | Hara | 347/57 |
| 4,345,262 A | 8/1982 | Shirato et al. | 347/10 |
| 4,459,600 A | 7/1984 | Sato et al. | 347/47 |
| 4,463,359 A | 7/1984 | Ayata et al. | 347/56 |
| 4,558,333 A | 12/1985 | Sugitani et al. | 347/65 |
| 4,608,577 A | 8/1986 | Hori | 347/66 |
| 4,723,129 A | 2/1988 | Endo et al. | 347/56 |
| 4,740,796 A | 4/1988 | Endo et al. | 347/56 |
| 5,825,377 A | 10/1998 | Gotoh et al. | 347/15 |
| 6,217,147 B1 * | 4/2001 | Holstun | 347/40 |

FOREIGN PATENT DOCUMENTS

| | | |
|---|---|---|
| JP | 54-56847 | 5/1979 |
| JP | 59-123670 | 7/1984 |
| JP | 59-138461 | 8/1984 |
| JP | 60-71260 | 4/1985 |

* cited by examiner

Primary Examiner—Thinh Nguyen
(74) Attorney, Agent, or Firm—Fitzpatrick, Cella, Harper & Scinto

(57) ABSTRACT

A printing method capable of printing a high-quality image at a high speed and low cost and a corresponding printing apparatus are disclosed. In this printing apparatus, a shading-corrected mask pattern for multipass printing control in consideration of the characteristics of each printing element of a printhead is generated. The size of the mask pattern in the conveyance direction of the printing medium is set to be an integer multiple of the conveyance amount of the printing medium per scanning of the printhead. Image data masked using the mask pattern is transferred to the printhead and printed. Alternatively, the conveyance-direction size of the mask pattern for masking print data in accordance with each pass printing of multipass printing is set to be equivalent to the number of nozzles of an ink-jet printhead having a plurality of nozzles arrayed in the conveyance direction of the printing medium, and the mask pattern is dividedly used for each pass printing. Any error of the position of a dot printed on the printing medium by an ink droplet discharged from each nozzle is detected in units of nozzles. Printing may be performed using a mask pattern generated such that a printing element with a small error is frequently used in accordance with the detection result, or performed such that the positions of print data are exchanged.

36 Claims, 16 Drawing Sheets

PRINTING METHOD AND PRINTING APPARATUS

FIELD OF THE INVENTION

This invention relates to a printing method and printing apparatus and, more particularly, to a printing method and printing apparatus for printing in accordance with, e.g., an ink-jet printing method.

BACKGROUND OF THE INVENTION

In a conventional serial printer and, more particularly, an ink-jet printer, head shading for measuring a variation in printed image density corresponding to each ink discharge nozzle (to be simply referred to as nozzles hereinafter) and correcting image data is performed to reduce a phenomenon (to be referred to as "deviated discharge" hereinafter) in which droplets are discharged while being deviated in different directions in units of nozzles of a printhead, generation of stripes (to be referred to as "undesirable stripes" hereinafter) at a boundary portion for printing corresponding to one printhead scanning due to a variation in conveyance amount of a printing medium such as a printing paper sheet, or density unevenness due to the difference in amount of discharged droplet between nozzles.

FIG. 16 is a block diagram showing head shading processing in a conventional serial printer. The processing shown in FIG. 16 assumes so-called multipass printing in which a printhead scans one region plural times to complete printing in that region.

For this processing, first, before execution of actual head shading processing, a patch is printed without executing head shading, and the relationship between the density of input data used for the printing and the density of an image printed by the printer is measured in units of nozzles. Next, the input data density correction coefficient for each nozzle is obtained from the measurement result. This relationship is stored in a table (shading data table 102 in FIG. 16) as shading data in a table format. If the input data resolution does not coincide with the printing resolution of the printer, the correction coefficient is determined in accordance with the input data resolution.

After this preparation, the actual head shading processing is executed.

As shown in FIG. 16, density data input from an input terminal 101 is input to the shading data table 102 and shading correction unit 103. The shading data table 102 outputs a correction coefficient corresponding to the input density value to the shading correction unit 103. The shading correction unit 103 corrects the input density value on the basis of the correction coefficient and outputs the corrected density value to a binarization unit (which is sometimes called bi-level conversion unit) 104.

The binarization unit 104 generates output data (bitmap data) of the printer by well-known binarization processing method and outputs the data to a printing buffer 107. The printing buffer 107 has a capacity to store bitmap data corresponding to printing for one scanning of a printhead+paper feed amount and constructs a ring buffer in units of paper feed amounts. A printing buffer control unit 106 controls input/output to/from the printing buffer 107. When bitmap data of one scanning of the printhead is stored in the printing buffer 107, the printing buffer control unit 106 activates a printer engine (not shown), reads out the bitmap data from the printing buffer 107 and outputs the data to a masking unit 109 as the printhead moves. When bitmap data is input from the binarization unit 104, the printing buffer control unit 106 controls and makes the printing buffer 107 store the data in a free area (area where data already printed is stored) of the printing buffer 107.

When the printer engine is activated, a pass number detection unit 105 detects the pass number (the sequence number of scanning cycle in one region in multipass printing) from the position of a nozzle corresponding to the bitmap data read out from the printing buffer 107 and outputs the pass number to an address generation unit 108. The address generation unit 108 generates a read address for a mask generation unit 110 on the basis of the pass number and printhead position.

The mask generation unit 110 is constructed by a lookup table (to be referred to as an "LUT" hereinafter) and outputs mask data corresponding to the address generated by the address generation unit 108 to the masking unit 109. The masking unit 109 calculates the logical-product (AND operation) of the bitmap data read out from the printing buffer 107 and the mask data from the mask generation unit 110 and transfers the calculation result to a printhead 111. Thus, the bitmap data is divided into data to be used in units of a plurality of passes.

In a conventional ink-jet printer, multipass printing for dividing an image corresponding to one scanning of a printhead into a plurality of scanning cycles and forming the image is also performed to reduce generation of stripes (to be referred to as "stripes due to a discharge position error" hereinafter) or density unevenness in the printed image, which occurs when the discharge position on the printing medium deviates from a predetermined position because of deviated discharge or a variation in conveyance amount of the printing medium.

FIG. 17 is a block diagram showing the outline of multipass printing control of a conventional ink-jet printer.

Bitmap data input from an input terminal 1111 is stored at a predetermined address of a printing buffer 1113 under the control of a buffer control unit 1112. The printing buffer 1113 has a capacity to store bitmap data corresponding to one scanning of a printhead+paper feed amount and constructs a ring buffer in units of paper feed amounts.

When the buffer control unit 1112 controls the printing buffer 1113 to store bitmap data corresponding to one scanning of the printhead in the printing buffer 1113, a printer engine (not shown) is activated. The bitmap data is read out from the printing buffer 1113 and output to a masking unit 1117 as a printhead 1001 moves. When bitmap data is input from the input terminal 1111, the printing buffer 1113 is controlled to store the data in a free area (area where data already printed is stored) of the printing buffer 1113.

When the printer engine is activated, a pass number detection unit 1116 detects the pass number from the position of a nozzle of the printhead 1001 corresponding to the bitmap data read out from the printing buffer 1113 and outputs the pass number to an address generation unit 1115. The address generation unit 1115 generates a read address for a mask generation unit 1114 on the basis of the pass number and printhead position.

The mask generation unit 1114 is constructed by a lookup table (LUT) and outputs mask data corresponding to the address generated by the address generation unit 1115 to the masking unit 1117. The masking unit 1117 calculates the logical-product of the bitmap data read out from the printing buffer 1113 and the mask data read out from the mask generation unit 1114, thereby masking the bitmap data such that printing is completed by scanning (passing) the printhead plural times. The masked bitmap data is transferred to the printhead 1001 by a head driver 1705.

In the above-mentioned conventional art, shading correction is performed for multivalued data before binarization. If print data and a nozzle of the printhead are not made to correspond to each other at this time, correction does not consider the discharge characteristics of each nozzle. However, actual printing is performed on the basis of binary data. Since the input data does not take the discharge characteristics of each nozzle into consideration, no accurate correction is performed.

To solve this problem, it is necessary to grasp the correspondence between each nozzle number of the printhead and each bit of the bitmap data obtained from binarization. However, always grasping such correspondence increases the load on a printer driver, which is a program installed in a personal computer or the like to perform printer control, and is actually almost impossible.

As described above, to strictly execute head shading, each nozzle and each bit of bit data must have a one-to-one correspondence. In multipass printing, data changes in units of passes depending on the mask pattern. For this reason, it becomes harder to make a one to one correspondence between each nozzle and data to be used in units of passes.

When the image data resolution is different from the printing resolution of the printer, the input resolution for shading correction must be matched with the output resolution of the printer, and additionally, correction curves (correction tables) must be provided in units of input densities and nozzles, resulting in enormous processing. Such enormous processing reduces the printing speed. If a circuit for performing the enormous processing at a high speed is provided, this results in increasing the apparatus cost.

In the conventional multipass printing, since a plurality of different mask patterns designated by pass numbers are stored in the mask generation unit 1114 in the format of an LUT, the pass number detection unit 1116 is indispensable for the apparatus, resulting in complex arrangement of the address generation unit 1115.

In a high-resolution printer, the ratio of fluctuation (to be referred to as a "printing error" hereinafter) of the printed dot position with respect to the diameter of the- dot printed by a discharged ink droplet is high. To reduce stripes by multipass printing, the number of divided passes need be considerably increased, resulting in very long print output time.

SUMMARY OF THE INVENTION

Accordingly, it is an object of the present invention to provide a printing method and printing apparatus which can print a high-quality image at a high speed and low cost.

According to one aspect of the present invention, the foregoing object is attained by providing a printing method of printing data on a printing medium under multipass printing control of a printhead having a plurality of printing elements, comprising: a generation step of generating a shading-corrected mask pattern for the multipass printing control in consideration of characteristics of each printing element of the printhead; a setting step of setting a size of the mask pattern in a conveyance direction of the printing medium to be an integer multiple of a conveyance amount of the printing medium per scanning of the printhead; and a printing step of applying the mask pattern to image data, transferring the masked image data to the printhead, and printing.

The image data is data obtained by binarizing multivalued density data.

The generation step may comprise generating a plurality of mask patterns in accordance with a density range of the multivalued density data. In this case, the method preferably further comprises a selection step of selecting one of the plurality of mask patterns in accordance with the density range of the multivalued density data.

The generation step preferably comprises, in units of printing elements of the printhead, inputting density data, performing correction to obtain a linear relationship between the input density data and an output density obtained from the printhead by actual printing, and generating the mask pattern on the basis of correction.

In accordance with the aspect of the present invention as described above, a mask pattern for multipass printing control, which is shading-corrected in consideration of characteristics of each printing element of the printhead, is generated, the size of the mask pattern in the conveyance direction of the printing medium is set to be an integer multiple of the conveyance amount of the printing medium in each scanning of the printhead, and image data masked using the mask pattern is transferred to the printhead for printing.

According to another aspect of the present invention, the foregoing object is attained by providing a printing method of printing data on a printing medium under multipass printing control of a printhead having a plurality of printing elements, comprising: a generation step of, in units of printing elements of the printhead, inputting data indicating a position of said printhead along a moving direction of the printhead and quantized data, and generating a conversion table used for outputting a shading-corrected dot pattern in consideration of characteristics of each printing element of the printhead; a setting step of setting a size of the conversion table in a conveyance direction of the printing medium to be an integer multiple of a conveyance amount of the printing medium per scanning of the printhead; and a printing step of inputting quantized data which has undergone pseudo-halftoning to the conversion table to convert the quantized data, transferring the converted quantized data to the printhead, and printing.

The pseudo-halftoning includes error diffusion processing.

The generation step preferably comprises, in units of printing elements of the printhead, inputting density data, performing correction to obtain a linear relationship between the input density data and an output density obtained from the printhead by actual printing, and generating a conversion table on the basis of correction.

In accordance with the aspect of the present invention as described above, in units of printing elements of the printhead, a dot pattern constructed by quantized data corresponding to a predetermined number of pixels in a moving direction of the printhead is input, and a conversion table used for outputting a dot pattern shading-corrected in consideration of characteristics of each printing element of the printhead is generated, the size of the conversion table in the conveyance direction of the printing medium is set to be an integer multiple of a conveyance amount of the printing medium in each scanning of the printhead, and quantized data which has undergone pseudo-halftoning is input to the conversion table and converted, and the converted quantized data is transferred to the printhead for printing.

According to still another aspect of the present invention, the foregoing object is attained by providing a printing apparatus for printing using the above printing method.

The printhead preferably comprises an ink-jet printhead for discharging ink for printing. In this case, the ink-jet printhead preferably comprises an electrothermal transducer for generating thermal energy to be given to ink to discharge the ink using the thermal energy.

According to still another aspect of the present invention, the foregoing object is attained by providing a printing method of printing data on a printing medium by multipass printing while scanning, in a direction perpendicular to a conveyance direction of the printing medium, a printhead having a plurality of printing elements arrayed in the conveyance direction, comprising: a setting step of setting a size of a mask pattern, in the conveyance direction, for masking print data in accordance with each pass printing of the multipass printing to be equivalent to the number of the plurality of printing elements arrayed on the printhead; and a division step of dividing the mask pattern for each pass printing, and using the divided mask pattern.

According to still another aspect of the present invention, the foregoing object is attained by providing a printing apparatus to which the above printing method is applied.

The printing apparatus comprises: conveyance means for conveying a printing medium; an ink-jet printhead having a plurality of printing elements arrayed in a conveyance direction of the printing medium; scanning means for reciprocally scanning the ink-jet printhead; a printing buffer for temporarily storing print data; and control means for controlling to print the data on the printing medium on the basis of the print data stored in the printing buffer using the ink-jet printhead by multipass printing using a mask pattern for masking the print data in accordance with each pass printing, wherein a size of the mask pattern in the conveyance direction is set to be equivalent to the number of the plurality of printing elements arrayed on the printhead, and the mask pattern is dividedly used for each pass printing.

The invention is particularly advantageous since a mask pattern need not be prepared in units of passes of multipass printing, and appropriate shading correction can be performed with a simple arrangement.

Since pseudo-halftoning and shading correction are integrated, shading correction can be performed with a simpler arrangement.

An LUT need not be prepared in units of passes of multipass printing. Processing such as pass detection associated with pass control can be omitted. Hence, multipass printing can be performed with a simpler arrangement, i.e., at lower cost.

In a case where an error of the position of a dot printed by each printing element of the printhead is detected, multipass printing can be performed using a nozzle with a minimum error in consideration of the detection result. For this reason, printing with higher quality can be performed.

In addition, the array of print data can be exchanged for printing. Even when, for example, the error of each printing element of the printhead exceeds the printing element pitch, high-quality printing can be performed.

Since high-quality image printing can be realized without increasing the number of passes for multipass printing, a high printing speed can be maintained.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENTS

Preferred embodiments of the present invention will now be described in detail in accordance with the accompanying drawings.

[First Embodiment]

Figure 1:
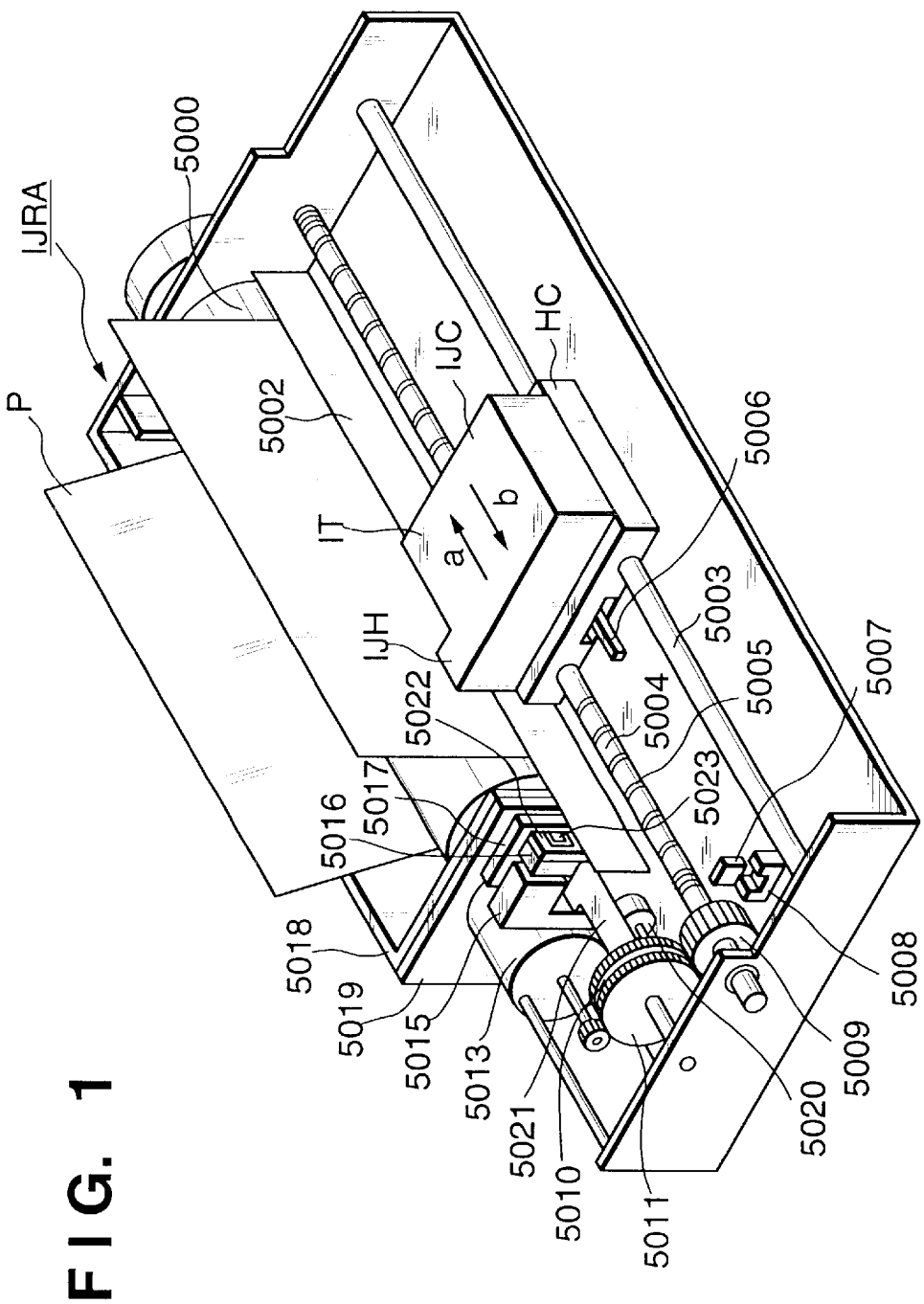
FIG. 1 is a perspective view showing the outer appearance of an ink-jet printing apparatus to which the present invention is applied.

FIG. 1 is a perspective view showing the outer appearance of an ink-jet printing apparatus (which is often called an ink-jet recording apparatus) IJRA as a typical embodiment of the present invention. Referring to FIG. 1, a carriage HC engages with a spiral groove 5005 of a lead screw 5004, which rotates via driving force transmission gears 5009 to 5011 upon forward/reverse rotation of a driving motor 5013. The carriage HC has a pin (not shown), and is reciprocally scanned in the directions of arrows a and b in FIG. 1. An integrated ink-jet cartridge IJC which incorporates a printing head IJH and an ink tank IT is mounted on the carriage HC. Reference numeral 5002 denotes a sheet pressing plate, which presses a paper sheet against a platen 5000, ranging from one end to the other end of the scanning path of the carriage. Reference numerals 5007 and 5008 denote photocouplers which serve as a home position detector for recognizing the presence of a lever 5006 of the carriage in a corresponding region, and used for switching, e.g., the rotating direction of the motor 5013. Reference numeral 5016 denotes a member for supporting a cap member 5022, which caps the front surface of the printing head IJH; and 5015, a suction device for sucking ink residue through the interior of the cap member. The suction device 5015 performs suction recovery of the printing head via an opening 5023 of the cap member 5015. Reference numeral 5017 denotes a cleaning blade; 5019, a member which allows the blade to be movable in the back-and-forth direction of the blade. These members are supported on a main unit support plate 5018. The shape of the blade is not limited to this, but a known cleaning blade can be used in this embodiment. Reference numeral 5021 denotes a lever for initiating a suction operation in the suction recovery operation. The lever 5021 moves upon movement of a cam 5020, which engages with the carriage, and receives a driving force from the driving motor via a known transmission mechanism such as clutch switching.

The capping, cleaning, and suction recovery operations are performed at their corresponding positions upon operation of the lead screw 5005 when the carriage reaches the home-position side region. However, the present invention is not limited to this arrangement as long as desired operations are performed at known timings.

[Description of Control Construction]

Next, control construction for performing printing operation in the above-described apparatus will be described.

Figure 2:
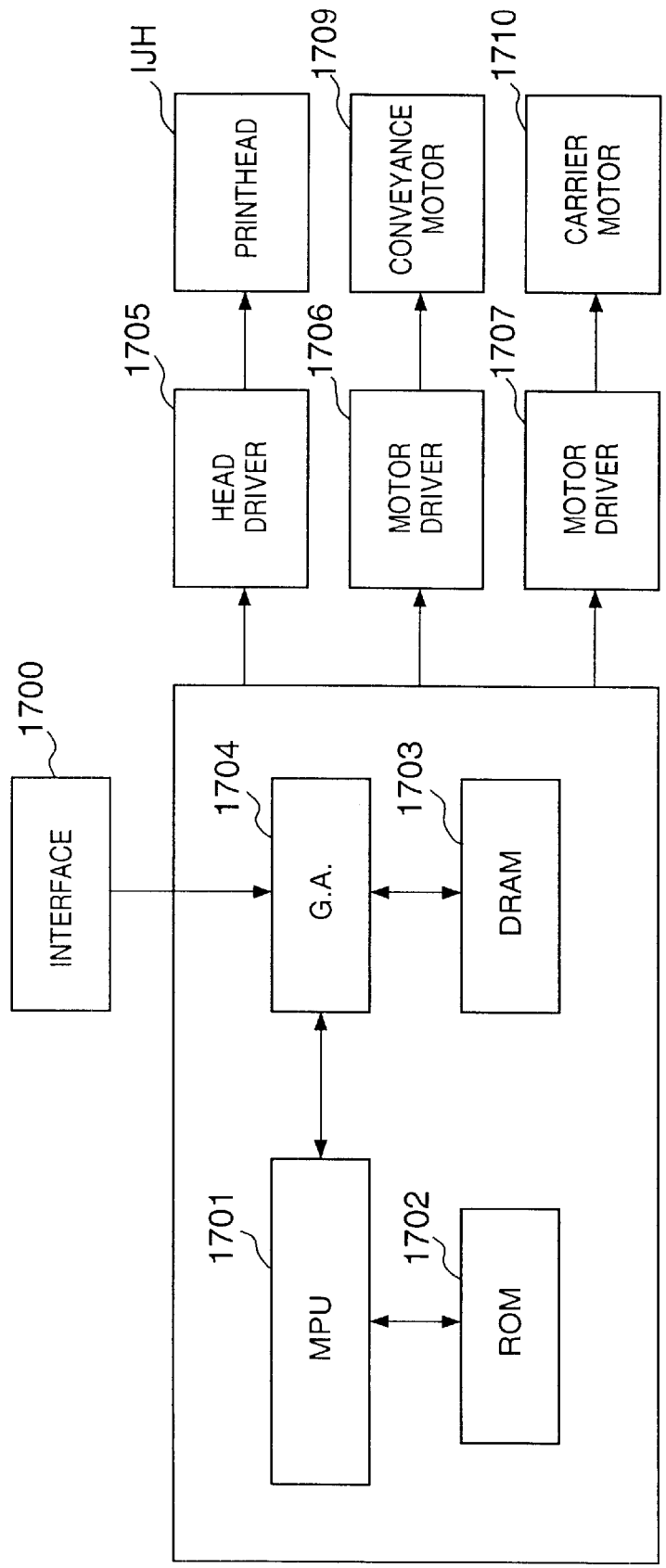
FIG. 2 is a block diagram showing the arrangement of the control circuit of the ink-jet printing apparatus shown in FIG. 1.

FIG. 2 is a block diagram showing the arrangement of a control circuit of the ink-jet printing apparatus. Referring to FIG. 2 showing the control circuit, reference numeral 1700 denotes an interface for inputting a printing signal from an external unit such as a host computer; 1701, an MPU; 1702, a ROM for storing a control program (including character fonts if necessary) executed by the MPU 1701; and 1703, a DRAM for storing various data (the printing signal, printing data supplied to the printing head, and the like). Reference numeral 1704 denotes a gate array (G.A.) for performing supply control of printing data to the printhead IJH. The gate array 1704 also performs data transfer control among the interface 1700, the MPU 1701, and the RAM 1703. Reference numeral 1710 denotes a carrier motor for transferring the printhead IJH in the main scanning direction; and 1709, a conveyance motor for conveying a printing sheet. Reference numeral 1705 denotes a head driver for driving the printhead; and 1706 and 1707, motor drivers for driving the conveyance motor 1709 and the carrier motor 1710.

The operation of the above control arrangement will be described below. When a printing signal is input to the interface 1700, the printing signal is converted into printing data for a printing operation between the gate array 1704 and the MPU 1701. The motor drivers 1706 and 1707 are driven, and the printhead IJH is driven in accordance with the printing data supplied to the head driver 1705, thus performing the printing operation.

This printing apparatus can perform multipass printing in which a printhead IJH scans one region on a printing medium plural times to complete an image. For this purpose, a shading data table (to be described later) is stored in the ROM 1702, and a mask LUT (to be described later) is stored in the RAM 1703.

Figure 3:
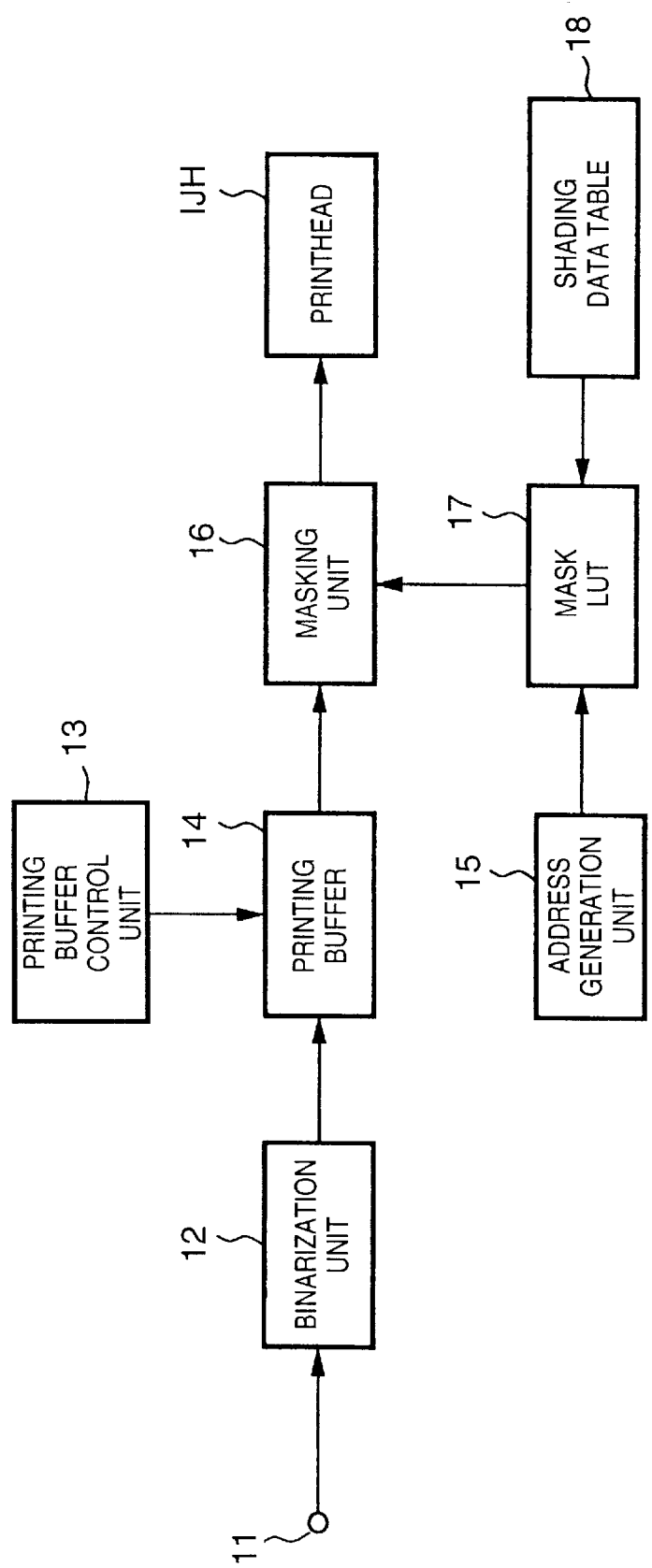
FIG. 3 is a functional block diagram of image processing executed in a first embodiment.

FIG. 3 is a functional block diagram of image processing executed in the first embodiment of the present invention. Part of this image processing is executed on the side of a printer driver installed in a host computer (to be referred to as a host hereinafter), and the remaining processing is executed on the printing apparatus side.

Referring to FIG. 3, reference numeral 11 denotes an input terminal for inputting multivalued density data; 12, a binarization unit; 13, a printing buffer control unit; 14, a printing buffer; 15, an address generation unit; 16, a masking unit; 17, a mask LUT; and 18, a shading data table.

As shown in FIG. 3, multivalued density data inputted from the input terminal 11 is converted into output data (bitmap data) for the printing apparatus in accordance with well-known binarization processing method by the binarization unit 12 and inputted to the printing buffer 14. In this embodiment, binarization processing by the binarization unit 12 is executed by the printer driver in the host, and the binary data (binarized bitmap data) is transferred to the printing apparatus. The printing apparatus receives the binary data through an interface 1700 and stores the data in the printing buffer 14 defined in the DRAM 1703. As described in the conventional art as well, the printing buffer 14 has a capacity to store bitmap data necessary for printing in a region corresponding to one scanning of the printhead IJH+paper feed amount per scanning and constructs a ring buffer in units of paper feed amounts.

The printing buffer control unit 13 controls input/output to/from the printing buffer 14. When bitmap data for one scanning of the printhead is stored in the printing buffer 14, the printing buffer control unit 13 activates the printer engine, reads out the bitmap data from the printing buffer 14 and outputs the data to the masking unit 16 as the printhead moves. When the bitmap data is inputted from the binarization unit 12, the printing buffer control unit 13 controls input/output of the printing buffer 14 to store the data in a free area (area where data already printed is stored) of the printing buffer 14.

The address generation unit 15 which is implemented by executing a control program by an MPU 1701 of the printing apparatus generates a read address of the mask LUT 17 on the basis of the moving-direction position of the printhead IJH. This processing is performed by providing data which indicates a position of the printhead IJH along the moving direction of the printhead IJH. The mask LUT 17 stores in advance mask data corresponding to the mask ratio (probability of dot masking) corresponding to a shading correction value stored in the shading data table 18. The mask LUT 17 outputs mask data corresponding to the read address generated by the address generation unit 15 to the masking unit 16.

The masking unit 16 which is realized by executing the control program by the MPU 1701 of the printing apparatus calculates the logical-product of the bitmap data read out from the printing buffer 14 and the mask data from the mask LUT 17 and transfers the calculation result to the printhead IJH. Thus, the bitmap data is divided into data to be used in units of a plurality of passes.

In the above description, image processing executed on the printing apparatus side is implemented by executing the control program by the MPU 1701. However, the image processing may be implemented by a dedicated logic circuit for executing these processing operations.

Figure 4:
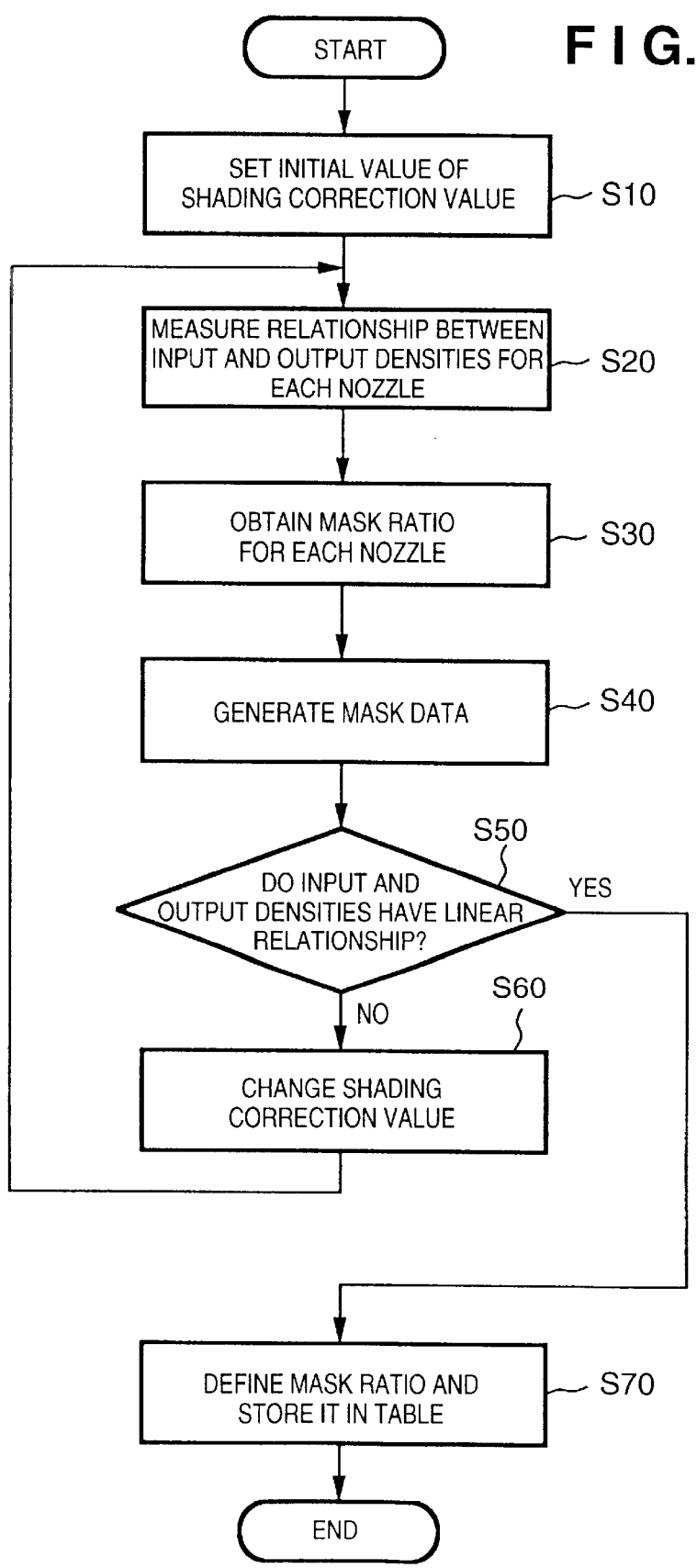
FIG. 4 is a flow chart showing mask data generation processing.

The mask data generation method will be described next with reference to the flow chart shown in FIG. 4. In this embodiment, the mask data is generated by defining the mask ratio for each nozzle of the printhead IJH.

First, a shading correction value ($s_i$: i=1, N (the number of nozzles of the printhead IJH)) given as an initial value is set (step S10).

A grayscale patch or the like is outputted from the printhead of the printing apparatus onto a printing medium.

The relationship between the density of input data used at this time and the density outputted by the printing apparatus is measured in units of nozzles (step S20). In other words, it is determined whether or not the density from each nozzle exceeds a reference density, or how much the density is higher or lower than the reference density.

From the measurement result, the mask ratio of each nozzle is obtained (step S30). Letting "p" be the number of divided passes (the number of passes in multipass printing) and "s" be the shading correction value of a given nozzle (n), the mask ratio (m) is given by $$m = s/p \tag{1}$$

Mask data is generated on the basis of this mask ratio and stored in the mask LUT 17 (step S40). Letting "x" be the size of the mask LUT 17 along the moving direction of the printhead IJH, the number (d) of dots of "1" in mask data of the mask LUT 17, which corresponds to one line corresponding to the ith nozzle of the printhead IJH, is given by $$d = x \cdot s/p \tag{2}$$

(since d is an integer, the result is rounded)

Hence, d "1"s are stored in the ith line of the mask LUT 17 at random in correspondence with the nozzle.

Next, a grayscale patch or the like is printed by the printhead using the mask pattern stored in the mask LUT 17. It is checked whether the input data density and the output density of the printing apparatus have a linear relationship (step S50). If NO in step S50, the shading correction value (s) is slightly changed by $\pm \Delta s$ (step S60). The flow returns to step S20, and the above processing is repeated until a linear relationship is obtained. If YES in step S50, the mask ratio for each nozzle is defined, and the flow advances to the next step.

Finally, the defined mask ratio (m) for each nozzle is stored in the shading data table 18 (step S70).

The shading data table 18 which stores the defined mask ratio (m) is obtained in the RAM 1703.

When the printing apparatus is powered on, mask data is generated on the basis of the mask ratio stored in the shading data table 18, and stored in the mask LUT 17 defined in the RAM 1703.

For example, assume that the number of divided passes (p) is "2", the shading correction value (s) of a certain nozzle is "0.9 (when the output density is relatively high, and a black stripe is printed)", and the size of the mask LUT 17 along the moving direction of the printhead IJH is 1,024 dots. In this case, the mask ratio (m) is 0.9/2=0.45, and the number of dots (d) with mask data of "1" is 0.45×1024=461.

Hence, 461 "1"s are stored in a line of the mask LUT 17 at random in correspondence with the nozzle.

More specifically, a dot having mask data of "1" is determined on the basis of an appropriate random function and mask ratio. An output value of a random function is compared with the mask ratio on each dot. When the output value of the random function is larger than the mask ratio, "0" is stored in the mask LUT 17. Otherwise, "1" is stored in the mask LUT 17.

If the printing apparatus can use a plurality of types of printing media and also a plurality of printing modes, mask ratios according to all the medium types and printing modes are stored in the shading data table 18 in advance. When the printing medium or printing mode to be used is changed, new mask data is generated and stored in the mask LUT 17 in accordance with the change on the basis of the mask ratio stored in the shading data table 18.

Figure 5:
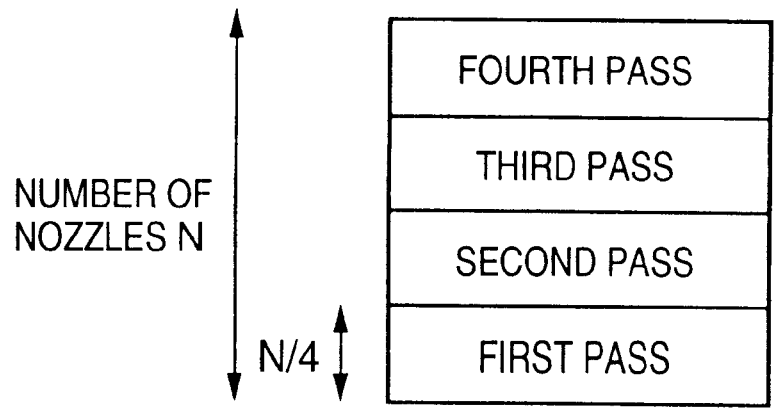
FIG. 5 is a view showing the correspondence between the mask LUT and passes used for four-pass printing.

FIG. 5 is a view showing the relationship between the mask LUT and passes used for four-pass printing. Referring to FIG. 5, when the number of nozzles of the printhead IJH is "N", the paper feed amount per scanning of the printhead is "N/4". In this way, in one region scanned by the printhead, four ink discharge opportunities are given using different nozzles of the printhead. In other words, four ink discharge opportunities are given by different nozzles of the printhead in four scannings while nozzles having printing opportunity in a certain pass are fixed depending on their positions. Hence, four-pass printing can be realized using one mask LUT.

According to the above-described embodiment, since the mask LUT need not be provided in units of printing passes, processing, such as pass detection, associated with pass control becomes unnecessary, unlike the conventional art. In addition, since shading correction is applied to binary bitmap data, the printer driver on the host need not grasp the nozzle number. When viewed from the host side, shading correction can be performed by the same processing as in the conventional art.

Figure 6:
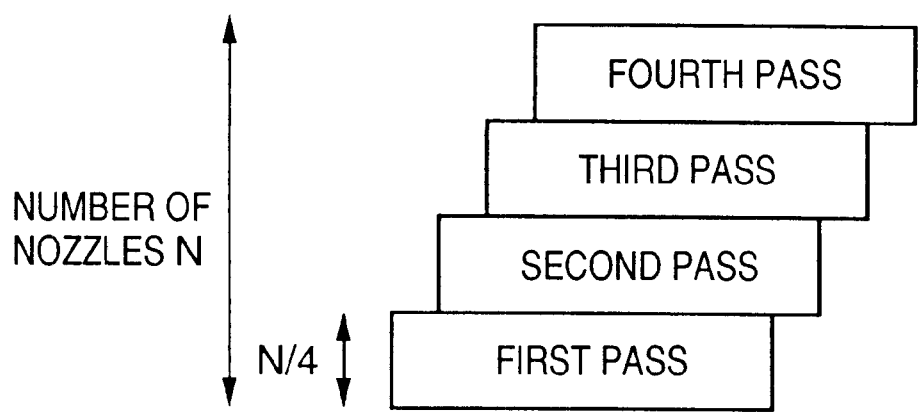
FIG. 6 is a view showing mask patterns whose start positions are shifted every printhead scanning.

Note that, in actual printing, to make the mask processing unit unnoticeable, the start positions of mask patterns are shifted every printhead scanning, as shown in FIG. 6.

In the above-described embodiment, one mask LUT is used for four-pass printing. However, the present invention is not limited to this. For example, a plurality of mask LUTs may be prepared, and an optimum mask LUT may be selected in accordance with the printing density that is checked for each predetermined printing region of the printhead IJH.

In this case, the mask LUTs are prepared in the following way.

In the above-described mask data generation, for example, when input density data contains 8-bit data per pixel, the density range from 0 to 255 is divided into four density ranges (e.g., 0 to 63, 64 to 127, 128 to 191, and 192 to 255). A grayscale patch in a specific density range is outputted on a printing medium. The mask ratio (m) for each nozzle is obtained in units of density ranges and stored in the shading data table 18. In this case, four mask LUTs 17 are generated in accordance with the four shading data tables.

These LUTs are stored in the RAM 1703 such that the LUTs can be discriminated by two storage address bits of each LUT. For example, the two upper storage address bits of a mask LUT 17-1 used for the density range 0 to 63 are set at "00", those of a mask LUT 17-2 used for the density range 64 to 127 are set at "01", those of a mask LUT 17-3 used for the density range 128 to 191 are set at "10", and those of a mask LUT 17-4 used for the density range 192 to 255 are set at "11".

Figure 7:
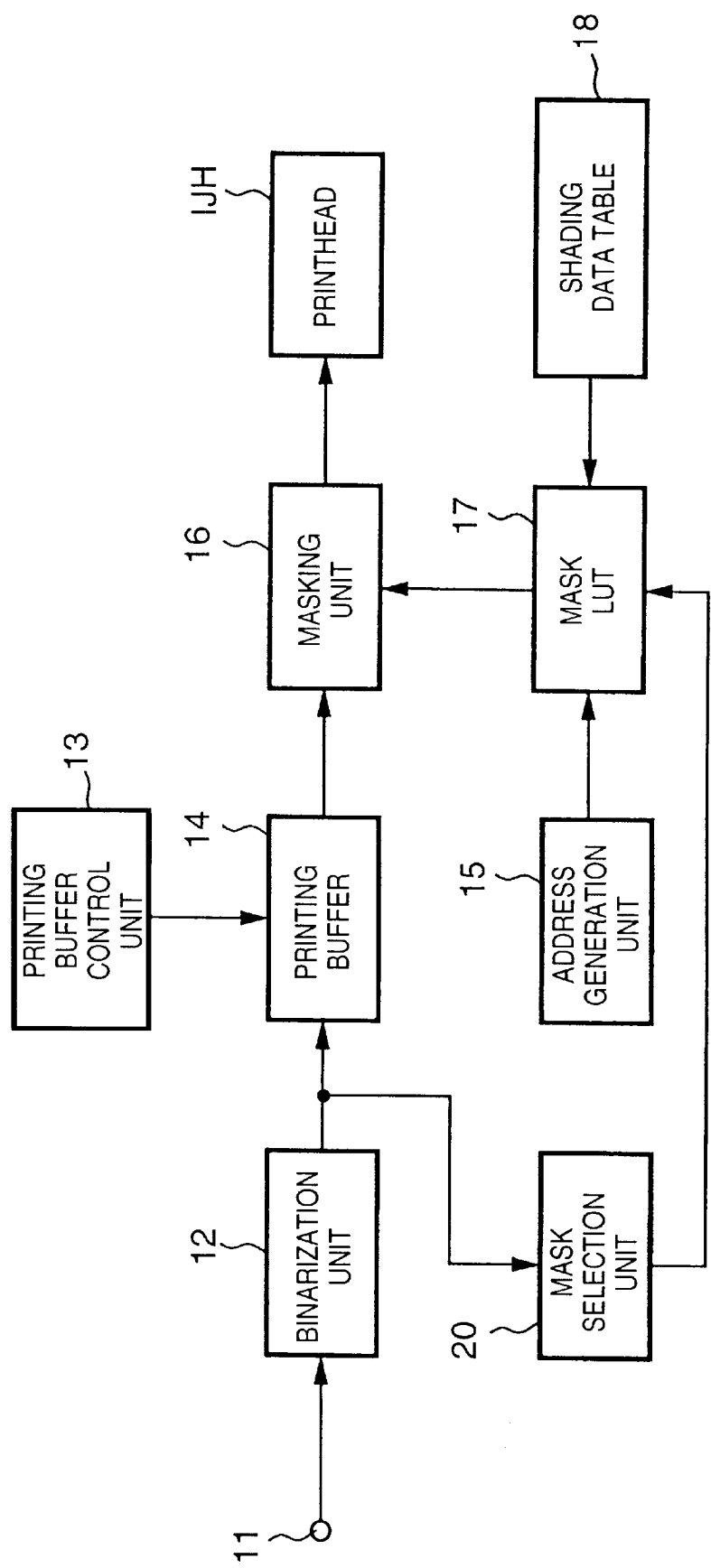
FIG. 7 is a functional block diagram showing a modification to image processing shown in FIG. 3.

In actual printing, a mask LUT is selected in accordance with the area density which is checked about binary data in units of regions each corresponding to the mask LUT size (1024 (moving direction of the printhead IJH)×N (the number of nozzles of the printhead IJH)). More specifically, a mask selection unit 20 is provided, as shown in FIG. 7. The mask selection unit 20 controls the read address of the mask LUT 17 to select appropriate mask data from a plurality of mask LUTs in accordance with the obtained density in units of regions each corresponding to the mask LUT size.

More specifically, two upper bits of the start address of a mask LUT corresponding to a density region are inputted to the mask LUT.

This also enables shading correction depending on the input density. In addition, wasteful correction for, e.g., a monotonous high-density region where shading correction is relatively ineffective can be avoided.

[Second Embodiment]

A case will be described below in which input density data is subjected to pseudo-halftoning and printed using error diffusion processing. This error diffusion processing is executed by the printer driver in a host.

Figure 8:
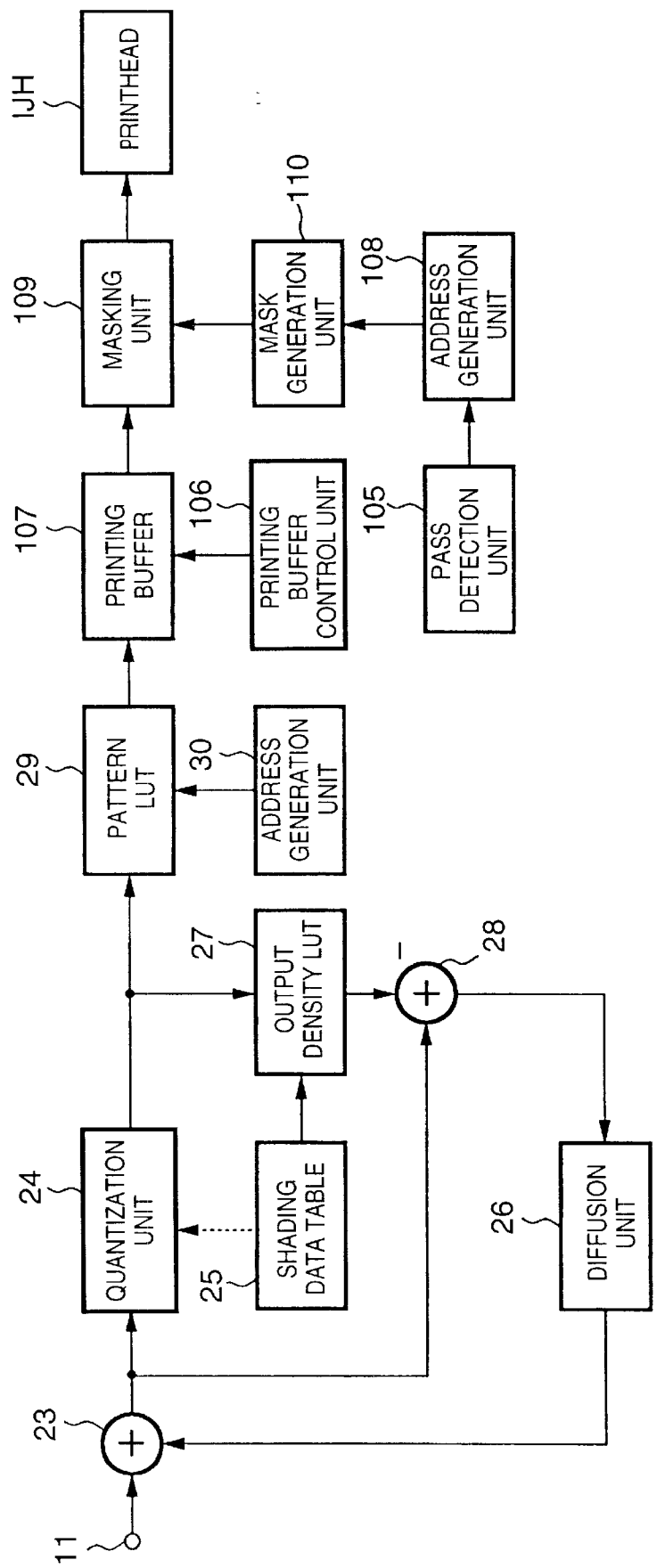
FIG. 8 is a functional block diagram of image processing executed in a second embodiment.

FIG. 8 is a functional block diagram of image processing according to the second embodiment.

The same reference numerals as in the above-described first embodiment and conventional art denote the same constituent elements in FIG. 8, and a detailed description thereof will be omitted. Referring to FIG. 8, reference numeral 23 denotes an adder; 24, a quantization unit; 25, a shading data table; 26, a diffusion processing unit; 27, an output density LUT; 28, a subtractor; 29, a dot pattern LUT; and 30, an address generation unit.

According to the arrangement shown in FIG. 8, multivalued density data (input density) input from an input terminal 11 is added to the density error of a neighboring pixel, which is outputted from the diffusion processing unit 26, quantized to a predetermined level by the quantization unit 24, and inputted to the dot pattern LUT 29 and output density LUT 27. The output density LUT 27 is an LUT used for converting the quantized density data into an output density of the printing apparatus, and stores the output density at each quantization level in units of nozzles of the printhead. The subtractor 28 outputs the error between the input density and the output density. The diffusion processing unit 26 diffuses the error to peripheral pixels at a predetermined ratio using a predetermined matrix pattern. The diffused error is added to the input density by the adder 23. That is, the circuitry from the adder 23 to the subtractor 28 executes multivalued error diffusion processing.

Shading correction data from the shading data table 25 is inputted to the output density LUT 27 to correct the output density, as shown in FIG. 8. In this way, shading correction is fed back to data which is to be finally transferred to the printing apparatus side.

The quantized density data is converted into a dot pattern by the dot pattern LUT 29 and transferred to a printing buffer 107 of the printing apparatus. The address generation unit 30 generates a read address on the basis of the printhead position in the moving direction and the nozzle position of the printhead in printing the current pixel.

This address generation is performed by providing data which indicates a position of the printhead along the moving direction of the printhead and data which indicates a nozzle position (nozzle number) of the printhead. Alternatively, this address generation may be performed by combining an address corresponding to a position along the moving direction and an address corresponding to the nozzle position.

The dot pattern LUT 29 stores dot patterns each corresponding to a dot pattern constructed by pre-quantized density data of a predetermined number of pixels in correspondence with each nozzle of a printhead IJH. A dot pattern (bitmap data) designated by the address generated by the address generation unit 30 is inputted to the printing buffer 107.

The bitmap data output to the printing buffer 107 is subjected to masking for each pass, which has been described in the conventional art, and outputted to the printhead, so multipass printing is performed.

In the above-described embodiment, the quantized density data which has undergone error diffusion processing for multivalued density data is converted into bitmap data in consideration of the nozzle position of the printhead to be used for printing, and transferred to the printing buffer of the printing apparatus. Hence, print data for which shading correction has been performed by the printer driver in consideration of the nozzle position of the printhead can be outputted to the printing apparatus. Thus, pseudo-halftoning and shading correction can be integrally executed by the printer driver.

The printing apparatus can have the same arrangement as in the conventional art. The host side need only replace the printer driver. For this reason, appropriate head shading can be easily performed.

The quantization characteristics may be changed by switching the value of the threshold value table incorporated in the quantization unit 24 in accordance with the shading correction value from the shading data table 25, as indicated by the dotted line in FIG. 8, thereby reducing the quantization error.

Figure 9:
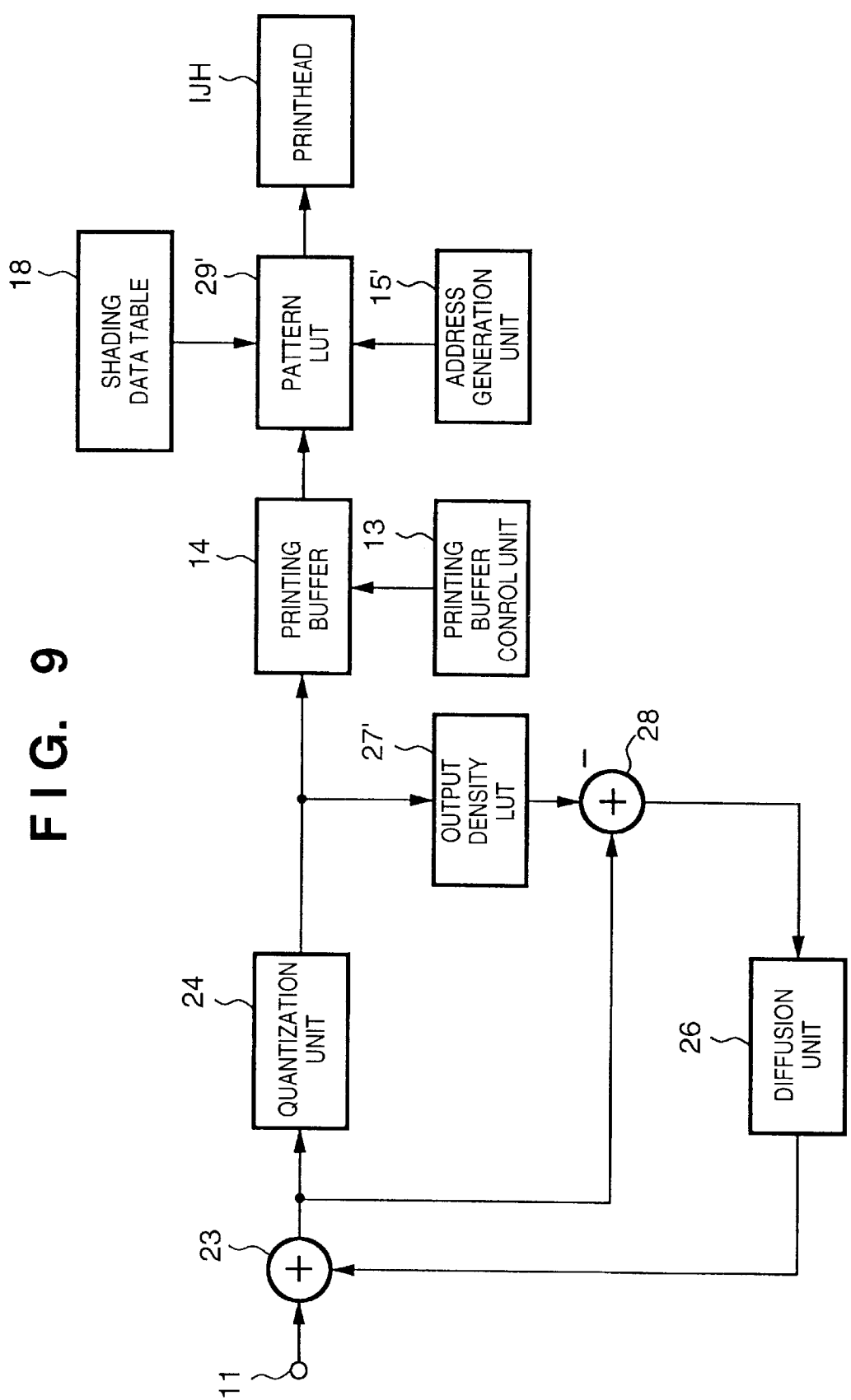
FIG. 9 is a functional block diagram showing a modification to image processing shown in FIG. 8.

In the above-described embodiment, shading correction is executed by the printer driver. However, the present invention is not limited to this. For example, shading correction may be executed on the printing apparatus side, as shown in FIG. 9. The same reference numerals as in the above-described embodiments and conventional art denote the same constituent elements in FIG. 9, and a detailed description thereof will be omitted.

According to the arrangement shown in FIG. 9, quantized density data obtained by performing multivalued error diffusion processing described with reference to FIG. 8 for input multivalued density data without considering shading correction is transferred to a printing buffer 14 of the printing apparatus. In this case, an output density LUT 27' stores information as to the correspondence between each quantization level and the output density of the printing apparatus. However, this information has no correspondence to each nozzle of the printhead IJH.

On the printing apparatus side, the quantized density data is received from the printer driver in the host and stored in the printing buffer 14. When quantized density data corresponding to the printing region in one scanning of the printhead IJH is stored in the printing buffer 14, a printing buffer control unit 13 controls input/output of density data to/from the printing buffer 14 and outputs the readout quantized density data to a dot pattern LUT 29' as the printhead IJH moves.

Additionally, the printing medium conveyance amount (CAS) every scanning of multipass printing is set as, e.g., N=n×CAS (n is a positive integer; n≧2), as shown in FIG. 5. In this way, in one region scanned by the printhead, n ink discharge opportunities by different nozzles of the printhead are given in n scannings while nozzles having printing opportunity in a certain pass are fixed depending on their positions.

The dot pattern LUT 29' is a conversion table used for, when quantized density data for a predetermined number of pixels is inputted in respect with each nozzle of the printhead IJH and the moving direction of the printhead IJH, converting the input density data into a dot pattern that has undergone shading correction considering the characteristics of each nozzle and outputting the dot pattern.

For example, assume that the printhead IJH can print by drop modulation, and density data quantized by multivalued error diffusion processing is four-level (2-bit) data. In this case, the printing buffer 14 stores a quantity of data containing 2-bit data per pixel in correspondence with a region corresponding to one scanning of the printhead IJH+paper feed amount per scanning.

An address generation unit 15' generates the read address of the dot pattern LUT 29' on the basis of the printhead position in the moving direction and the nozzle position of the printhead in printing the current pixel.

The dot pattern stored in the dot pattern LUT 29' is a pattern corresponding to the mask ratio (probability of dot masking) corresponding to the shading correction value of each quantized density stored in a shading data table 18 in advance. To form this pattern, a dot pattern is generated in place of a mask pattern according to almost the same procedures described with reference to the flow chart shown in FIG. 4 in the first embodiment.

In a case where a dot pattern composed of different diameter (density) dots is generated, for example, by using drop modulation, shading correction may be performed by exchange of a large size dot and a small size dot besides the above mask ratio. More specifically, if it is desirable to increase a density in a nozzle line, a small size dot in the line may be replaced by a large size dot. On the other hand, if it is desirable to decrease a density in a nozzle line, a large size dot in the line may be replaced by a small size dot.

In the arrangement shown in FIG. 9, since the printing pass is fixed depending on the nozzle position, processing such as pass detection associated with pass control can be omitted, unlike the arrangement shown in FIG. 8.

In addition, since shading correction is executed for quantized data, the printer driver on the host side need not grasp the nozzle number, so the load on the host side can be further reduced. The host side need only execute pseudo-halftoning by the same processing as in the conventional art. Furthermore, since quantized density data is stored in the printing buffer, the capacity of the printing buffer can be reduced.

[Third Embodiment]
[Arrangement of Ink-Jet Printing Apparatus (FIGS. 10 and 11)]

Figure 10:
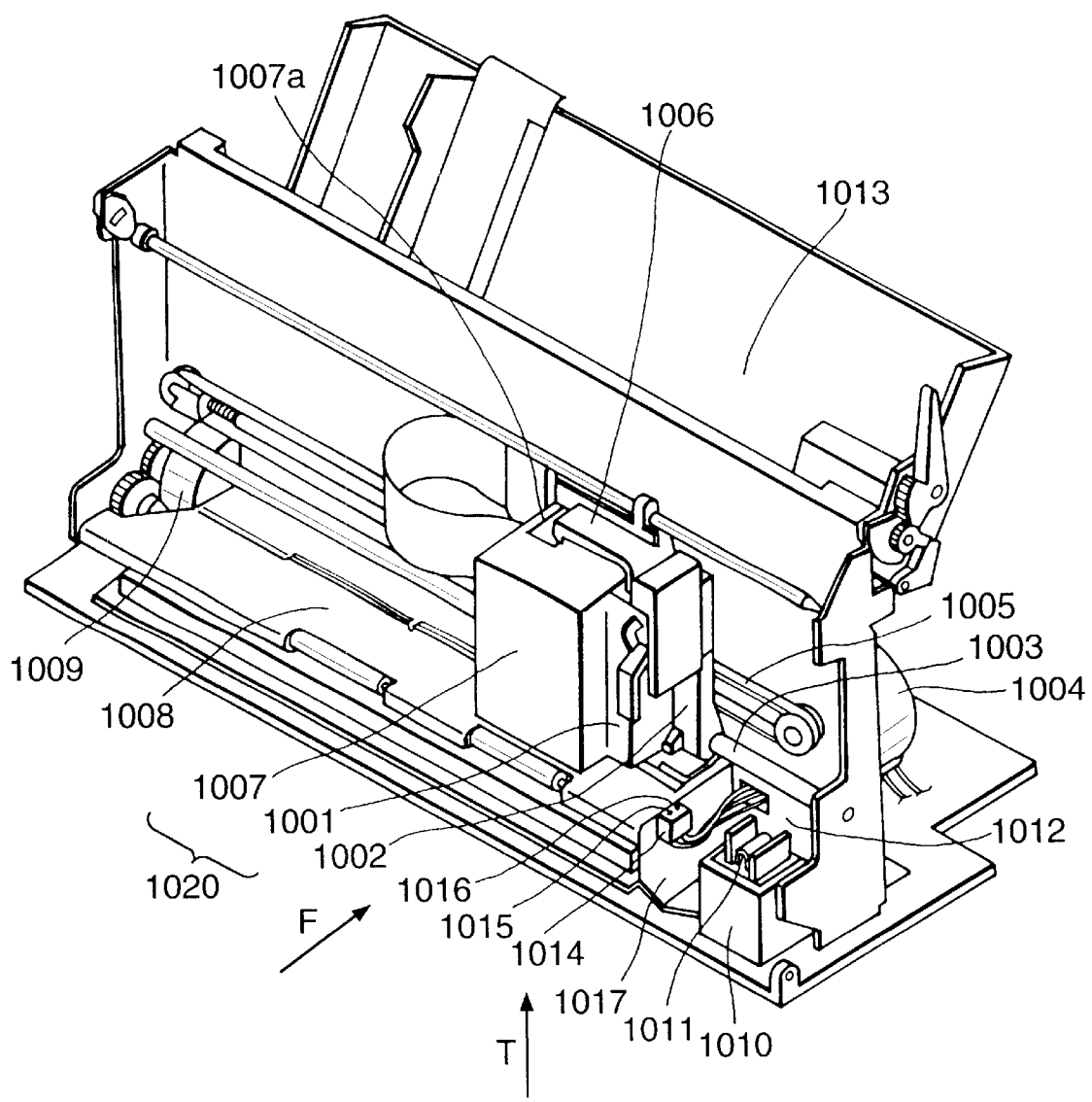
FIG. 10 is a perspective view showing another example of the arrangement of an ink-jet printing apparatus to which the present invention is applied.

FIG. 10 is a perspective view showing another exemplary schematic construction of an ink-jet printing apparatus, to which the present invention is applied, which includes a printhead. In this embodiment, a printhead 1001 connected with an ink tank 1007 which supplies ink thereto construct an ink cartridge 1020 as shown in FIG. 10. Note, in the present embodiment, although the ink cartridge 1020 is configured such that the printhead 1001 and ink tank 1007 are separable, an ink cartridge where a printhead and ink tank are integrated as a unit may be used.

On the bottom surface of the ink tank 1007, a light-reflection surface used for detecting existence/non-existence of ink is provided.

Referring to FIG. 10, the printhead 1001 is attached to a carriage 1002 in the manner such that the printhead discharges ink downward in FIG. 10. While the carriage 1002 moves along a guide 1003, the printhead 1000 discharges ink droplets to form an image on a print medium (not shown) e.g. print paper. Note that the lateral movement (reciprocal movement) of the carriage 1002 is realized by rotation of a carriage motor 1004 via a timing belt 1005. The carriage 1002 has an engagement latch 1006 which engages with an engagement slot 1007*a* of the ink tank, fixing the ink tank 1007 to the carriage 1002.

Upon printing for one scan by the printhead, the printing operation is suspended, a print medium positioned on a platen 1008 is conveyed a predetermined amount by driving a feed motor 1009, and image forming for the subsequent scan is performed by moving the carriage 1002 along the guide 1003.

Although the detail will be described later, the printing apparatus according to this embodiment can perform printing control (multipass printing) such that the carriage 1002 to which the printhead is attached reciprocally scans the same area in a printing medium plural times without conveying the printing medium so as to complete printing operation in connection with printing for one scanning by the printhead.

On the right side of the main body of the printing apparatus, a recovery device 1010 which performs recovery operation for maintaining a good ink discharge condition is provided. The recovery device 1010 includes a cap 1011 for capping the printhead 1001, a wiper 1012 for wiping the ink discharge surface of the printhead 1001, and a suction pump (not shown) for sucking ink from the ink discharge nozzle of the printhead 1001.

The driving force of the feed motor 1009 for conveying a printing medium is normally transmitted not only to the print medium conveyance mechanism, but also to an automatic sheet feeder (ASF) 1013.

Moreover, on the side of the recovery device 1010, an optical unit 1014, consisting of an infrared LED (light emission device) 1015 and phototransistor (photoreceptor) 1016, is provided for detecting existence/non-existence of ink. The light emission device 1015 and photoreceptor 1016 are arrayed in the conveyance direction of a printing medium (direction indicated by the arrow F). The optical unit 1014 is attached to a chassis 1017 of the main body of the printing apparatus. Upon attaching the ink cartridge 1020 to the carriage 1002, if the carriage 1002 moves to the right from the position shown in FIG. 10, the ink cartridge 1002 comes to the position above the optical unit 1014. In this position, it is possible to detect from the bottom of the ink tank 1007 the ink existence by using the optical unit 1014.

As described above, the above-mentioned printing apparatus employs a reflection type sensor for detecting existence/non-existence of ink.

A control arrangement for executing printing control of the above-described apparatus will be described next.

Figure 11:
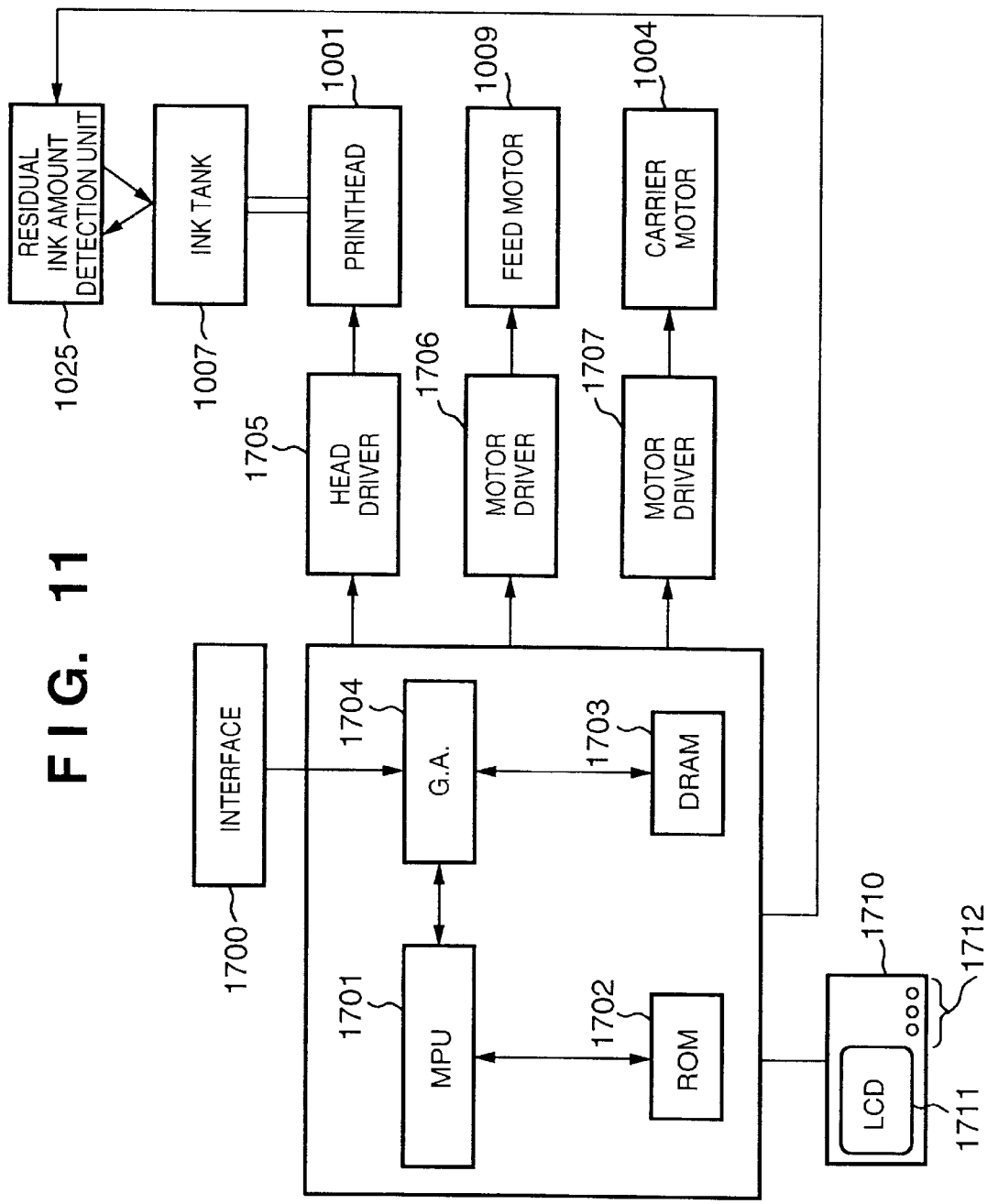
FIG. 11 is a block diagram showing the arrangement of the control circuit of the printing apparatus shown in FIG. 10.

FIG. 11 is a block diagram showing the arrangement of the control circuit of a printing apparatus. The same reference numerals as in FIG. 2 denote the same constituent elements in the control circuit shown in FIG. 11, and a detailed description thereof will be omitted.

A display unit 1710 has an LCD 1711 for indicating various messages related to the state of the printing operation or printing apparatus, various color LED lamps 1712 for notifying the user of the state of the printing operation or printing apparatus, and a buzzer (not shown) for generating alarm sound.

The operation of an ink existence/non-existence detection unit 1025 for detecting the presence/absence of ink in an ink tank 1007 integrated with a printhead 1001 is controlled by an MPU 1701.

Embodiments of image processing for multipass printing to be executed by the above printing apparatus will be described below.

Figure 12:
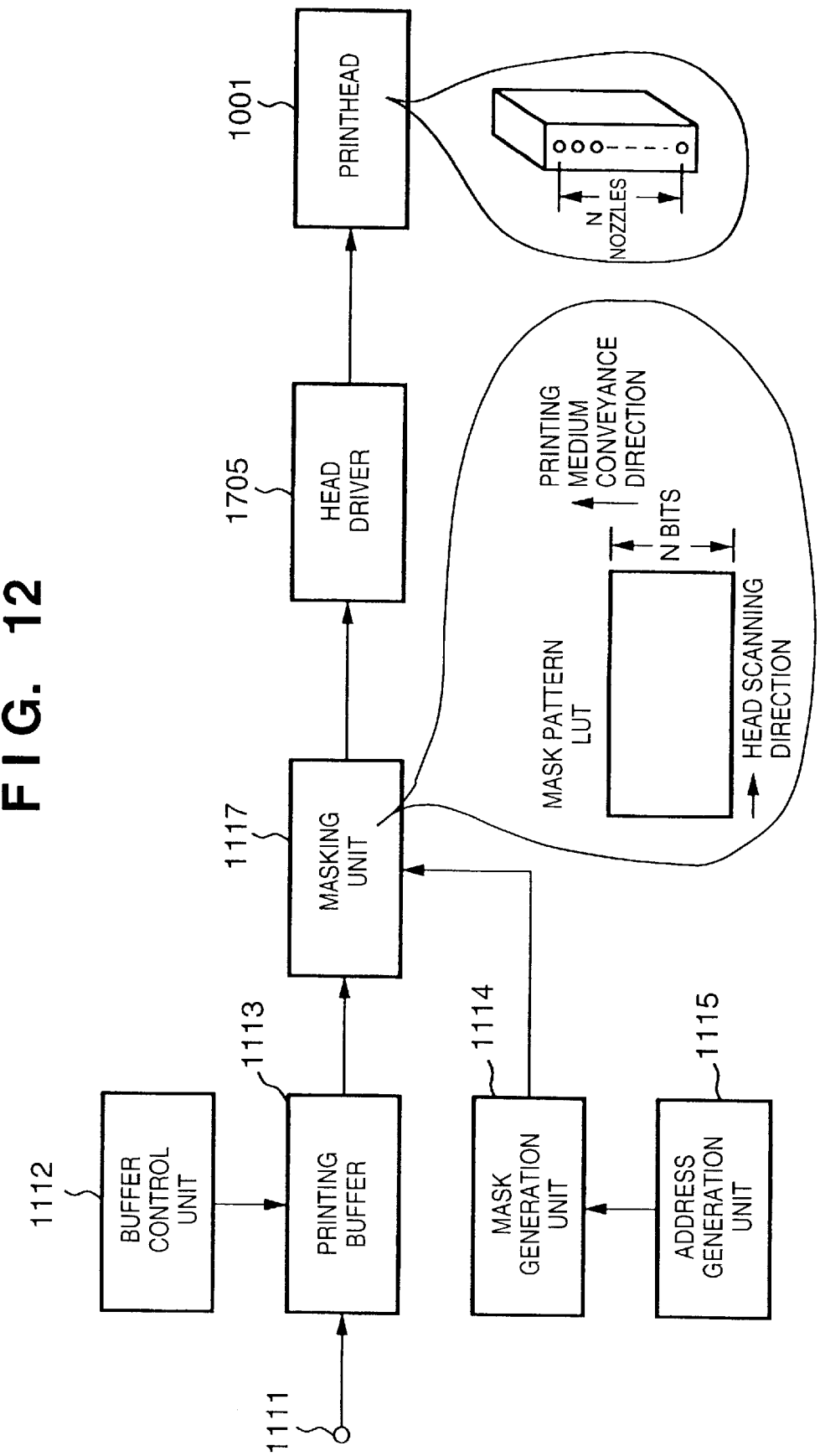
FIG. 12 is a block diagram showing the functional arrangement of image processing according to a third embodiment.

FIG. 12 is a block diagram showing the functional arrangement of image processing according to the third embodiment.

Figure 17:
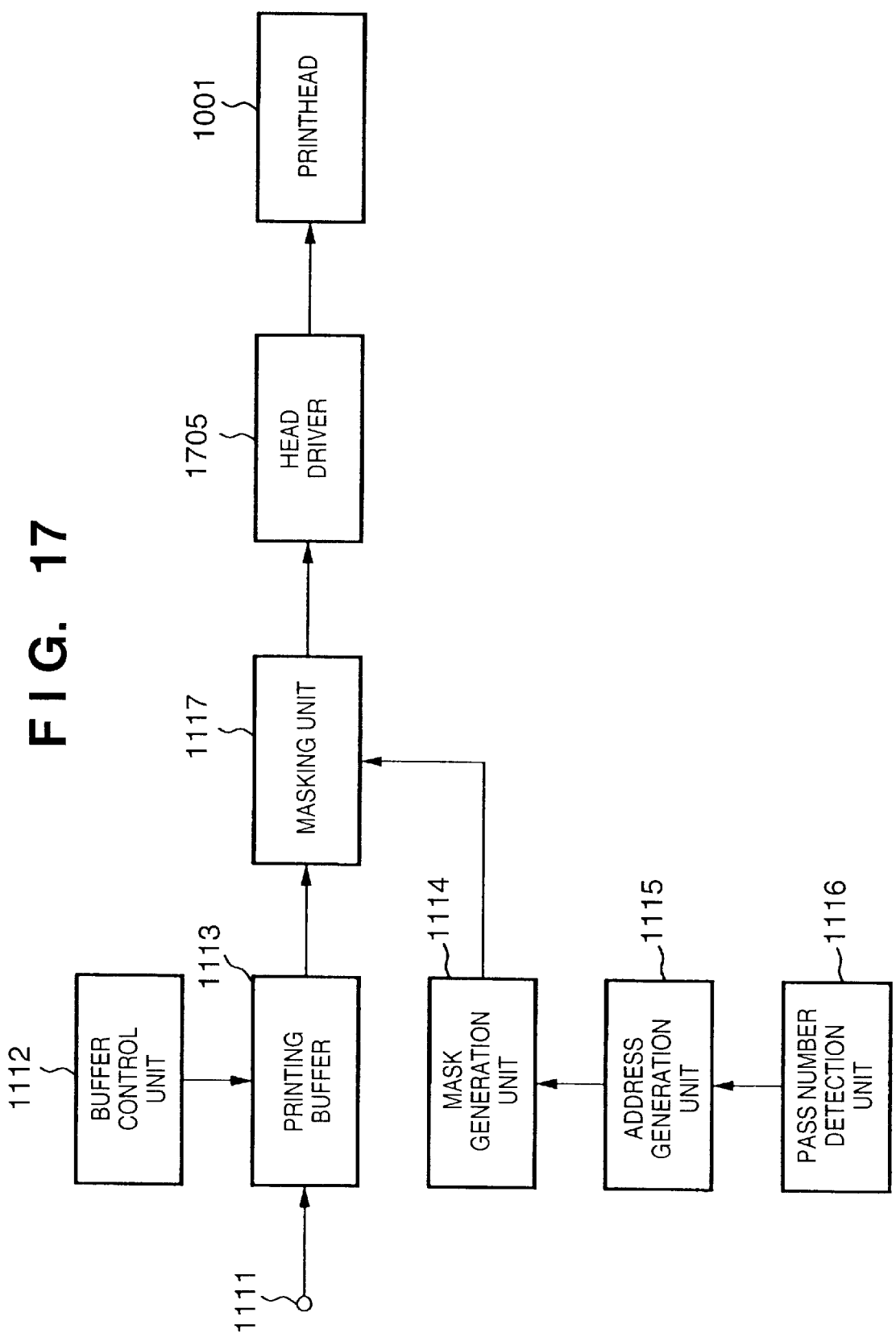
FIG. 17 is a block diagram showing the outline of multipass printing control of a conventional ink-jet printer.

The same reference numerals as in FIG. 17 of the conventional art denote the same constituent elements in FIG. 12, and a detailed description thereof will be omitted.

As shown in FIG. 12, the printhead 1001 has N nozzles. The nozzles are arranged in the printing medium conveyance direction. The size of an LUT included in a masking unit 1117 is N bits in the printing medium conveyance direction. The number of nozzles of the printhead equals the size of the LUT in the printing medium conveyance direction.

Bitmap data stored in a printing buffer 1113 is read out in accordance with the position of a nozzle of the printhead 1001 and outputted to the masking unit 1117. When bitmap data for the next scanning-printing operation is inputted from an input terminal 1111, control is performed to store the bitmap data in a free area (area where unnecessary data already printed by multipass printing is stored: in the printing medium conveyance direction, this area corresponds to the paper feed amount for multipass printing) of the printing buffer 1113.

When the printing apparatus shown in FIG. 10 is activated, an address generation unit 1115 generates, on the basis of the printhead position, a read address to be used by a mask generation unit 1114. The mask generation unit 1114 outputs mask data to the masking unit 1117 using the read address. As described in the conventional art, the masking unit 1117 calculates the logical-product of the bitmap data read out from the printing buffer 1113 and the mask data read out from the mask generation unit 1114, thereby masking the bitmap data such that printing is completed by scanning (passing) the printhead plural times. The masked bitmap data is transferred to the printhead 1001 by a head driver 1118.

Figure 13A:
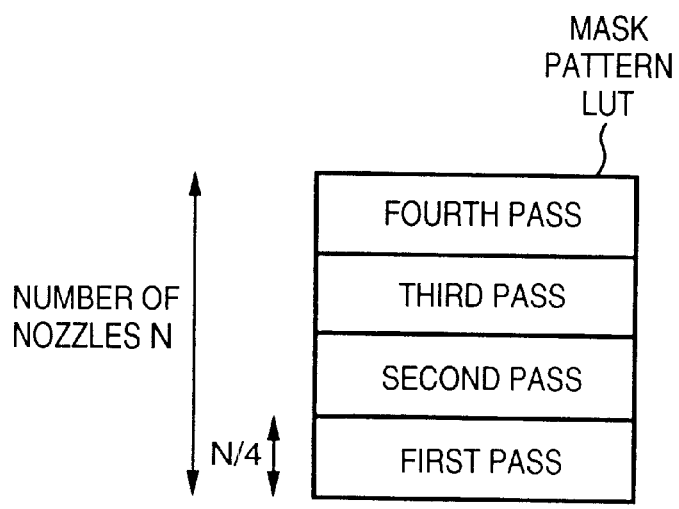
FIGS. 13A and 13B are views showing correspondences to the passes of an LUT of a mask generation unit 1114 in four-pass printing.
Figure 13B:
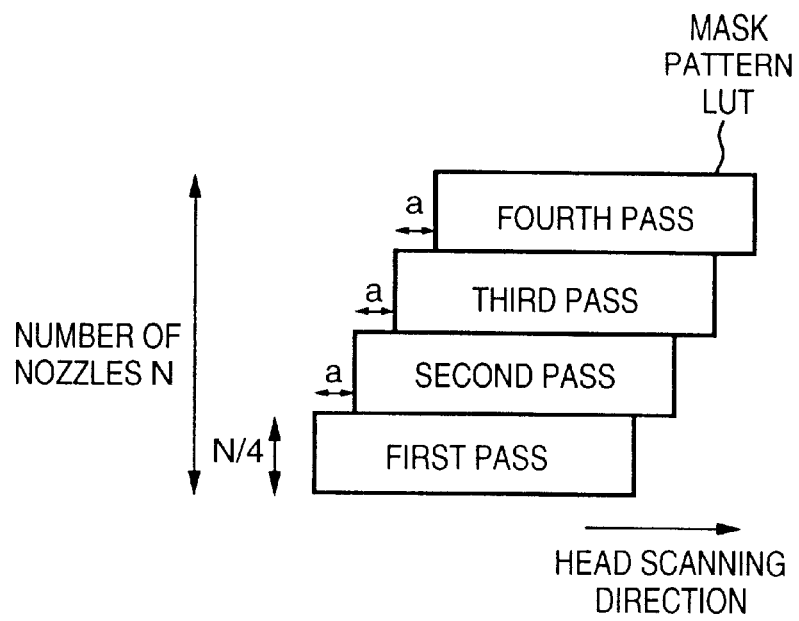

FIGS. 13A and 13B are views showing correspondences between each pass and the LUT of the mask generation unit 1114 in four-pass printing. Since the number of nozzles of the printhead 1001 is N, and four-pass printing is performed, the printing medium conveyance amount per scanning is N/4.

FIG. 13A is a view showing only the relationship between the portions of the mask pattern and the passes used for printing. FIG. 13B is a view showing the manner the mask pattern LUT is used in actual multipass printing. As shown in FIG. 13B, the mask processing unit is made nonconspicuous by shifting the mask patterns by a pixels in the head scanning direction every pass printing.

As described above, according to this embodiment, the LUT size in the printing medium conveyance direction matches the number of nozzles of the printhead. Since mask patterns and nozzles have a one-to-one correspondence in this direction, the pass number is fixed depending on the position of the nozzle of the printhead. Thus, different LUTs need not be provided in units of passes, and one LUT can be commonly used. Hence, processing associated with detection control, e.g., processing of determining a pass and an LUT for the pass can be omitted, and the conventional control arrangement for multipass printing can be made simpler.

[Fourth Embodiment]

Figure 14:
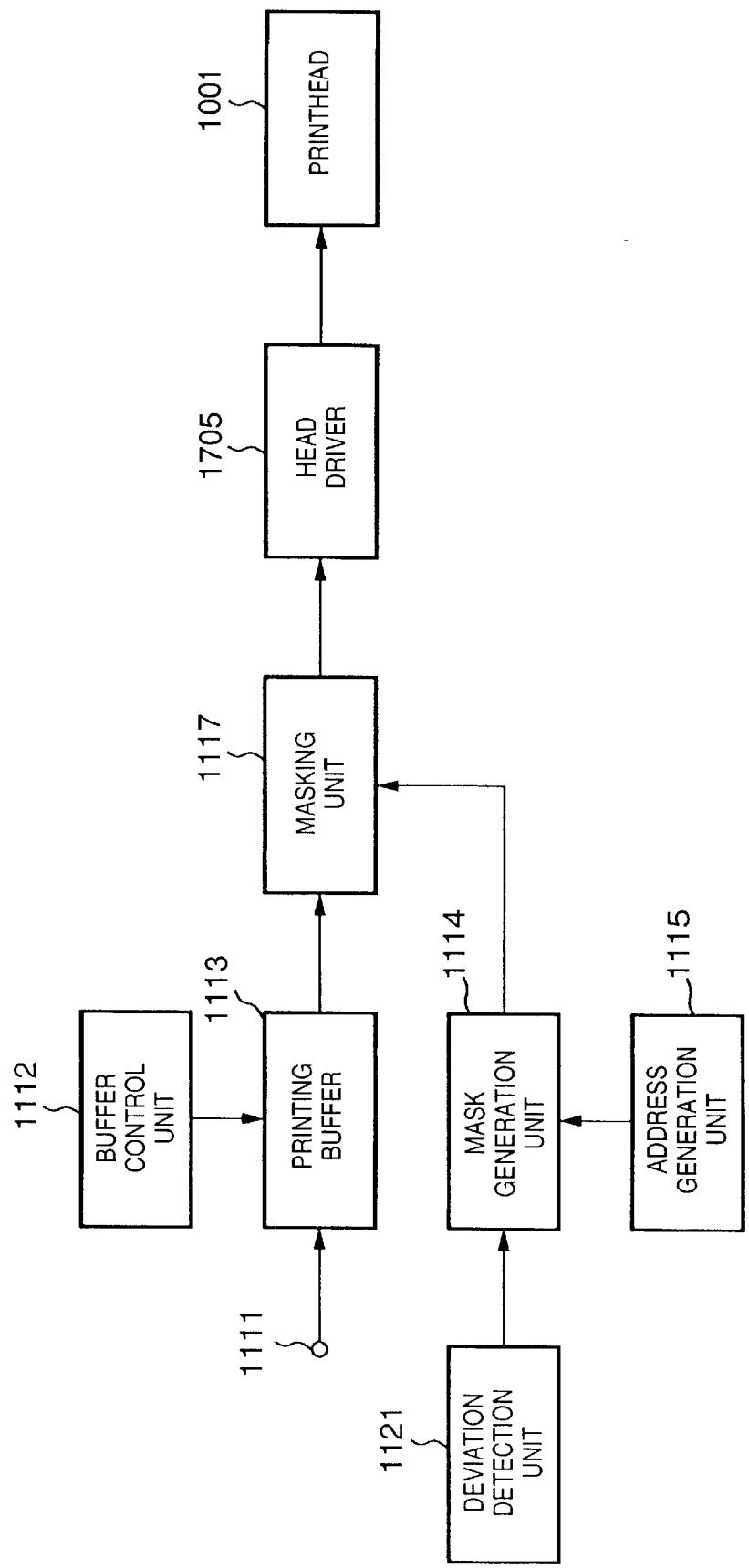
FIG. 14 is a block diagram showing the arrangement of an image processing unit according to a fourth embodiment.

FIG. 14 is a block diagram showing the arrangement of image processing according to the fourth embodiment.

The same reference numerals as in FIG. 12 of the third embodiment and FIG. 17 of the conventional art denote the same constituent elements in FIG. 14, and a detailed description thereof will be omitted.

Multipass printing to be described in this embodiment is four-pass printing, as in the third embodiment. The number of nozzles of a printhead 1001 is N, the size of a mask pattern LUT along the printing medium conveyance direction is N bits, and the printing medium conveyance amount per pass printing is N/4.

Referring to FIG. 14, a deviation detection unit 1121 has a circuit combining, e.g., an LED and CCD to detect the deviated amount of each nozzle of the printhead 1001. A printing medium on which an image is printed is irradiated with light from the LED, the reflected light is received by the CCD, and the received signal is analyzed to detect the "deviated amount". This detection measurement may be performed in real time in synchronism with the normal printing operation or by printing another predetermined pattern on the printing medium. The result data obtained by analyzing the pattern printed on the printing medium by a CCD scanner or the like may be inputted to the deviation detection unit 1121.

When the deviated amount of each nozzle of the printhead 1001 is stored in the deviation detection unit 1121 according to the above procedure, the LUT of a mask generation unit 1114 is updated in accordance with the deviated amount.

The LUT generation method of the mask generation unit 1114 will be described next.

In four-pass printing, each dot of bitmap data is printed in one of the four passes. That is, each dot of bitmap data is formed by one of the four nozzles. If a dot is formed by a nozzle having a large absolute deviation value, a stripe is formed on the printed image. Thus, if the deviated amount of each nozzle is known, the stripe can be prevented by forming a dot by a nozzle having a sufficiently small absolute deviation value.

(1) First Generation Method

According to this method, an LUT is generated such that a dot is formed using, of nozzles which may form one dot on bitmap data, a nozzle having a minimum absolute deviation value.

For example, when N=64, the nozzles are divided into four passes each having 16 nozzles. One dot on bitmap data is formed using one of four nozzles separated by 16 nozzles. Hence, "1" (printed) is stored at an LUT address corresponding to the nozzle position having the minimum absolute deviation value in four nozzles separated by 16 nozzles, and "0" (not printed) is stored at LUT addresses corresponding to the remaining nozzle positions.

According to this method, an LUT for only masking nozzles except the nozzle having the minimum absolute deviation value in the nozzle array direction of the printhead suffices. The LUT need only have a size (capacity) of N (nozzle array direction)×1 (printhead moving direction) (bit).

(2) Second Generation Method

According to this method, an LUT is generated such that a dot is formed without using, of nozzles which may form one dot on bitmap data, nozzles having a predetermined absolute deviation value or more in the nozzle array direction.

For example, let "d" be the dot pitch, "r" be the dot diameter, "y" be the deviated amount in the nozzle array direction, and "α" be the shift by paper feed. When the value "y" falls within the range $$(d-r+\alpha)/2 < y < (r-d-\alpha)/2 \qquad (1)$$

(when r−d−α>0)
adjacent dots in the nozzle array direction connect with each other, and no white stripe is formed (assume that the deviated amount in the printhead moving direction is negligible).

Hence, "0" is stored at LUT addresses corresponding to nozzle positions where condition (1) does not hold, "1" is stored at an LUT address corresponding to one of the remaining nozzle positions, and "0" is stored at LUT addresses corresponding to the remaining nozzle positions.

The nozzle of the printhead, which corresponds to the LUT address at which "1" is stored, is selected at random from nozzles which satisfy condition (1). If none of the four nozzles satisfy condition (1), "1" is stored at an LUT address corresponding to the nozzle position having a minimum absolute deviation value in the nozzle array direction.

According to this method, since nozzles having a predetermined absolute deviation value or more in the nozzle array direction are masked, and the remaining nozzles are used at random to form the output image, the occurrence of a stripe due to a shift by paper feed can be reduced.

To make such a random pattern unnoticeable, the LUT needs to have a size (capacity) of N (nozzle array direction)×M (printhead moving direction) (bits).

(3) Third Generation Method

According to this method, an LUT is generated such that an output image is formed using, of nozzles which may form one dot on bitmap data, a combination of nozzles which satisfy the following condition.

For example, let "d" be the dot pitch, "r" be the dot diameter, "y1" be the deviated amount of the first dot of two dots adjacent in the nozzle array direction (+in the direction toward a second dot), "y2" be the deviated amount of the second dot, and "α" be the margin for the shift by paper feed (α>0). A condition under which no gap is formed between two consecutive dots (α=0 for dots in one pass) satisfies $$r-(d-y1+y2+\alpha)>0 \quad (2)$$

(when r−d−α>0 for dots in different passes)

A condition under which two dot positions do not reverse satisfies $$y1-y2<d-\alpha \quad (3)$$

From equations (2) and (3), we have $$d-r+\alpha<y1-y2<d-\alpha \quad (4)$$

In this method, an LUT is generated according to the following procedure.

① All LUT addresses are initialized to "0".

② From nozzles that form the first pass, nozzles having a predetermined absolute deviation value (e.g., d) or less are selected. If there is a dot formed by a nozzle which does not satisfy the above condition (4), a nozzle having a minimum absolute deviation value is selected from nozzles for forming the dot, as in the first generation method (or the minimum absolute deviation value of the nozzle for forming the dot is set as the predetermined value, and nozzles are selected again).

③ "1" is set at an LUT address corresponding to the position of an arbitrary one of the selected nozzles in the nozzle array direction.

④ "1" is set at an LUT address corresponding to the position of an arbitrary one of the nozzles which satisfy the above condition (4) for either one of two adjacent dots corresponding to the addresses set at "1". Assume that the boundaries between adjacent passes continue (for example, a dot under the lowermost dot of the first pass corresponds to the uppermost dot of the second pass).

⑤ Procedure ④ is repeated until "1" is stored in one of passes 1 to 4 at all dot positions. If no nozzle position satisfies the above condition (4), an LUT address corresponding to either one of two dots adjacent to a dot of interest is initialized to "0". The process returns to procedure ③ to set "1" at an LUT address corresponding to the position of another arbitrary nozzle. Then, the process is repeated from procedure ④.

If no nozzle position satisfying inequality (4) is detected even after the above procedure is repeated a predetermined number of times, a nozzle closest to the above condition (4) is selected.

The LUT need to have a size (capacity) of N (nozzle array direction)×M (printhead moving direction) (bits).

(4) Fourth Generation Method

According to this method, an LUT is generated such that the use ratio of nozzles which may form one dot on bitmap data changes depending on the deviated amount in the nozzle array direction. More specifically, an LUT is set such that, the smaller the absolute deviation value of a nozzle is, the more frequently the nozzle is used, or the smaller the absolute deviation value of a nozzle is, the less the nozzle is used (for example, 2/5, 1/5, and 0). Since four-pass printing is taken into consideration herein, there are four nozzles which may form one dot.

For example, let "d" be the dot pitch, and "y" be the absolute deviation value in the nozzle array direction. The absolute value is compared with two threshold values "d/2" and "d", and values "y" are classified into three ranges (y<d/2, d/2≦y<d, and d≦y). The use ratio is set in accordance with the number of nozzles in each range, and an LUT is generated. Table 1 shows examples of use ratios.

TABLE 1

| The number of nozzles ||| Use ratio |||
|---|---|---|---|---|---|
| y < d/2 | d/2 ≦ y < d | d ≦ y | y < d/2 | d/2 ≦ y < d | d ≦ y |
| 4 | 0 | 0 | 1/4 | 0 | 0 |
| 3 | 1 | 0 | 1/3 | 0 | 0 |
| 3 | 0 | 1 | 1/3 | 0 | 0 |
| 2 | 2 | 0 | 1/3 | 1/6 | 0 |
| 2 | 1 | 1 | 2/5 | 1/5 | 0 |
| 2 | 0 | 2 | 1/2 | 0 | 0 |
| 1 | 3 | 0 | 1/2 | 1/6 | 0 |
| 1 | 2 | 1 | 1/2 | 1/4 | 0 |
| 1 | 1 | 2 | 3/5 | 2/5 | 0 |
| 1 | 0 | 3 | 1/2 | 0 | 1/6 |
| 0 | 4 | 0 | 0 | 1/4 | 0 |
| 0 | 3 | 1 | 0 | 1/3 | 0 |
| 0 | 2 | 2 | 0 | 1/3 | 1/6 |
| 0 | 1 | 3 | 0 | 1/2 | 1/6 |
| 0 | 0 | 4 | 0 | 0 | 1/4 |

In this method as well, the LUT needs to have a size (capacity) of N (nozzle array direction)×M (printhead moving direction) (bits).

(5) Fifth Generation Method

According to this method, an LUT is generated such that an output image is formed using, of nozzles which may form one dot on bitmap data, a combination of nozzles such that a value obtained by accumulating overlap areas of two dots adjacent in the nozzle array direction over the printhead moving direction is almost constant over each dot interval on the bitmap image.

More specifically, letting "a" be the overlap area of dots in an ideal state where the error of the ink discharge position to a printing medium is "0", and "b1", "b2", "b3", ..., "bN" be the overlap areas of dots in consideration of deviation, nozzles to be used are controlled such that N×a≈Σbi.

The overlap area of dots is defined by the dot diameter and distance between dots. If a variation in dot diameter (r) is neglected, the overlap area of dots is a function S(β) of the dot distance β. In an ideal state where the deviation is "0", the distance (β) between adjacent dots equals the dot pitch "d" of the printhead. At this time, the overlap area (ideal area) of adjacent dots is S(d).

In this method, the LUT is generated according to the following procedure.

In this method as well, the LUT need to have a size (capacity) of N (nozzle array direction (column direction))×M (printhead moving direction (row direction)) (bits).

① The values of an LUT and registers (to be referred to as accumulated error registers hereinafter) for storing accumulated errors between dots are initialized to "0".

②First, for M=1, a nozzle having a minimum absolute deviation value is selected from nozzles which may form one dot, and "1" is stored at an address corresponding to the position of the selected nozzle of the first column (M=1) of the LUT having the size of N×M.

③The distance (β) between adjacent dots formed by the selected nozzle is obtained. The differences {S(d) −S(β)} (=ΔS) from the ideal area are calculated for the respective dot distances and held in the accumulated error registers to select the nozzle of the next column (the dot distance is calculated assuming that a dot printed by the lowermost nozzle of the printhead continues to a dot printed by the uppermost nozzle).

④A dot distance for which ΔS set in the accumulated error register is maximum is detected. For a dot of the same row and the next column, a nozzle combination for which accumulation of the differences (ΔS) from the ideal area is minimum is selected, and "1" is set at an address corresponding to the position of the selected nozzle of the next column of the LUT having the size of N×M. At this time, the accumulation of the differences (ΔS) from the ideal area are held in the accumulated error registers to select a nozzle of the next column.

In this way, values of the LUT are set in the row direction.

⑤Of nozzles for forming dots-adjacent in the nozzle array direction, a nozzle for which the accumulation of the differences (ΔS) from the ideal area is minimum is selected, and "1" is set at an LUT address corresponding to the nozzle position. At this time, the accumulation of the differences (ΔS) from the ideal area are held in the accumulated error registers to select a nozzle of the next column. Note that it is assumed that a dot printed by the lowermost nozzle of the printhead continues to a dot printed by the uppermost nozzle.

In this way, values of the LUT are set in the column direction.

⑥Processes ④ and ⑤ are repeated until nozzles of the printhead to be used for printing at all dot positions are determined.

⑦When nozzles of the printhead to be used for printing at all dot positions are determined, the value of each accumulated error register is compared with a predetermined value (Th). Processes ④ and ⑤ are repeated while changing the nozzle combination until absolute values stored in all the accumulated error registers become equal to or smaller than the predetermined value Th.

M must be set to satisfy condition ⑦.

When there are a plurality of nozzles for which the accumulation of differences from the ideal area is minimum, a nozzle for which the difference between the overlap area of dots and the ideal area becomes minimum in the printhead moving direction is selected.

In the above description, the LUT is generated in consideration of the overlap area of dots in the nozzle array direction. However, the LUT may be generated also in consideration of the overlap area of dots in the printhead moving direction. In this case, since the overlap of dots is stored in association with both of the nozzle array direction and the printhead moving direction, the number of accumulated error registers is increased to twice or more.

According to the above-described embodiment, multipass printing can be performed using an LUT which stores a mask pattern for enabling printing using a nozzle with minimum deviation in consideration of the deviated amount of each nozzle of the printhead. For this reason, higher-quality printing can be performed.

Since high-quality image printing can be realized without increasing the number of passes for multipass printing, a high printing speed can be maintained.

[Fifth Embodiment]

Figure 15:
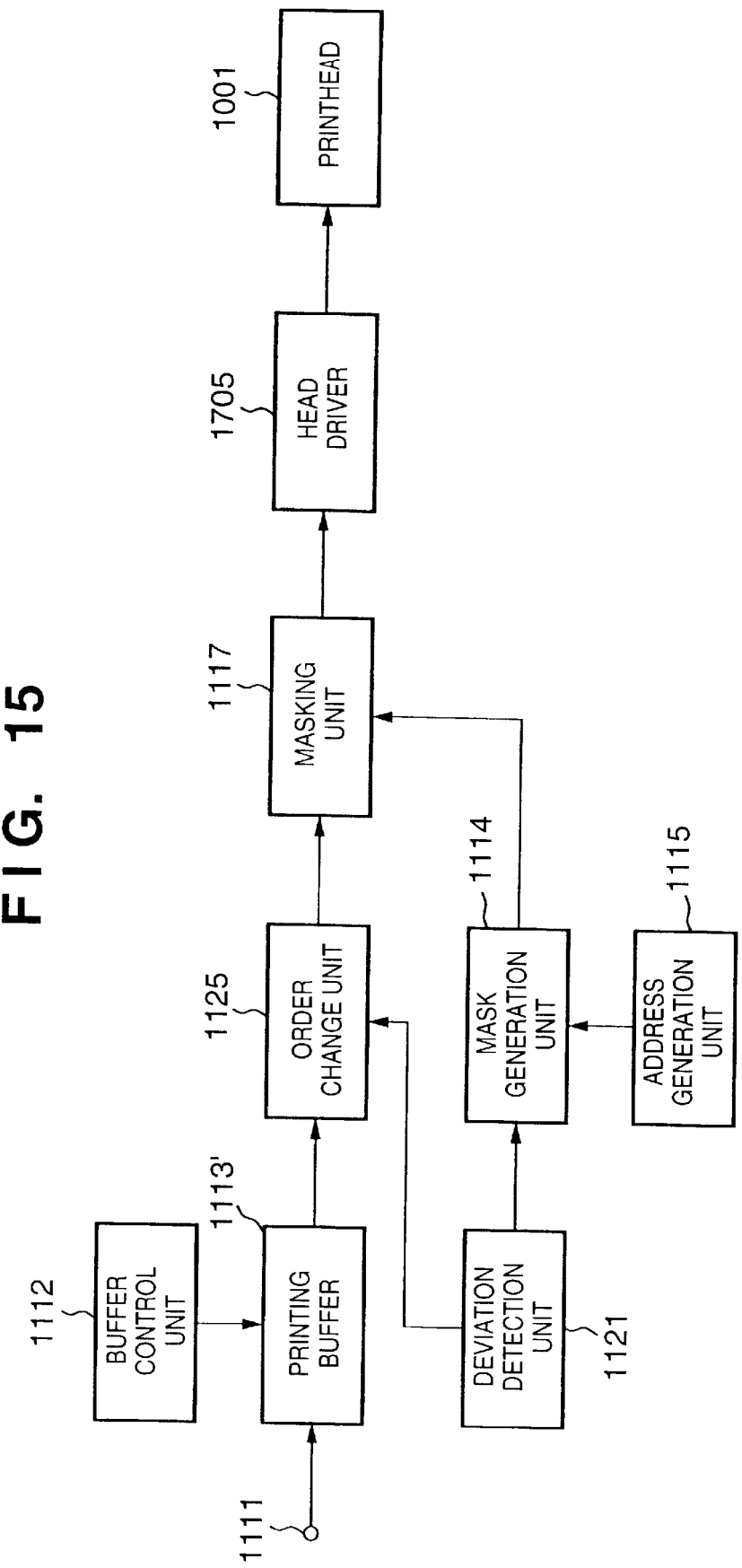
FIG. 15 is a block diagram showing the arrangement of an image processing unit according to a fifth embodiment.
Figure 16:
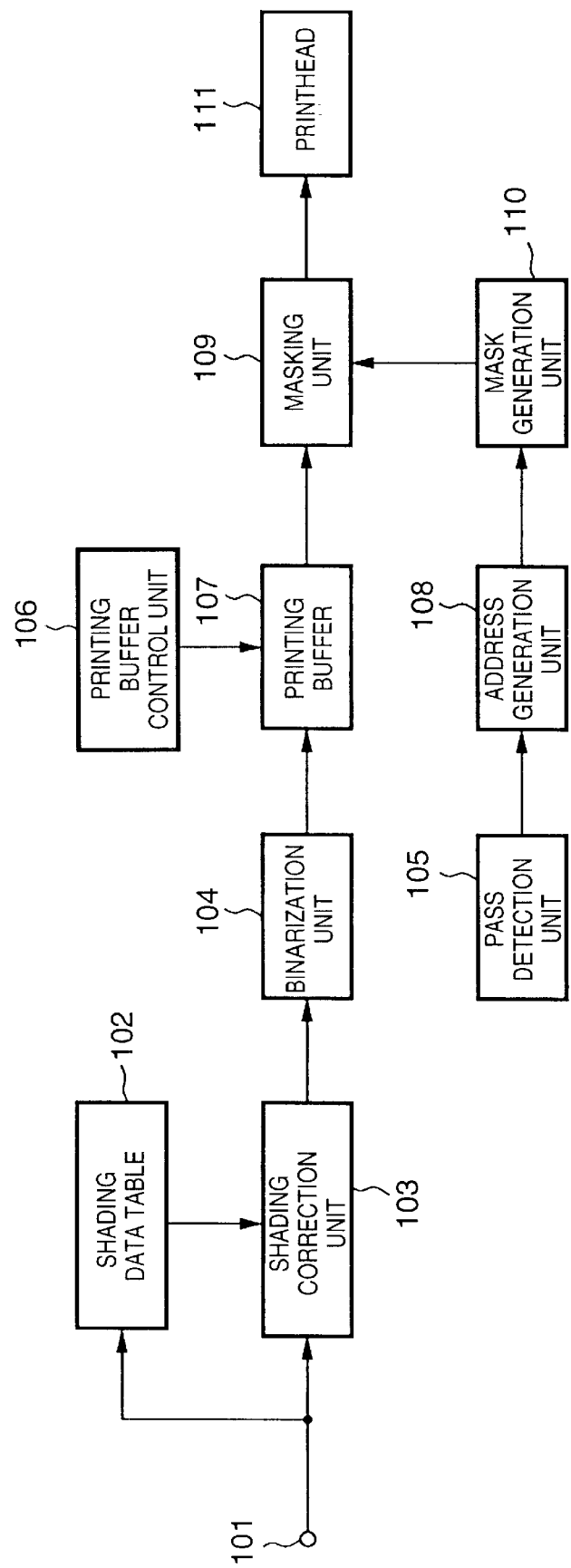
FIG. 16 is a block diagram showing head shading processing in a conventional serial printer.

FIG. 15 is a block diagram showing the arrangement of image processing according to the fifth embodiment.

The same reference numerals as in FIG. 12 of the third embodiment, FIG. 14 of the fourth embodiment, and FIG. 17 of the conventional art denote the same constituent elements in FIG. 15, and a detailed description thereof will be omitted.

Multipass printing to be described in this embodiment is four-pass printing, as in the third embodiment. The number of nozzles of a printhead 1001 is N, the size of a mask pattern LUT in the printing medium conveyance direction is N bits, and the printing medium conveyance amount per pass printing is N/4.

Referring to FIG. 15, a nozzle order change unit 1125 changes the array order of print data in the nozzle array direction. The nozzle order change unit 1125 operates to change the array order in accordance with the detection result from the deviation detection unit 1121.

More specifically, when the deviation detection unit 1121 for detecting the deviated amount of each nozzle of it the printhead 1001 determines that the deviated amount is very large in the nozzle array direction of the printhead 1001, and actual ink droplet sticking positions on a printing medium are expected to reverse, the nozzle order change unit 1125 is instructed to change the nozzle allocation order. In addition, the deviated amount is corrected in accordance with the change in nozzle allocation order.

For example, assume that the nozzle has nozzles A and B in this order, and dots to be formed by ink droplets discharged from these nozzles will be arranged not in the order of the dot of the nozzle A and that of the nozzle B but in the order of the dot of the nozzle B and that of the nozzle A. In this case, print data allocated to the nozzle A and that allocated to the nozzle B are exchanged with each other such that the data to be originally allocated to the nozzle A is allocated to the nozzle B, and vice versa. In other words, the order of bitmap data allocated to the nozzles A and B is reversed as if the data were allocated to the nozzles B and A in this order.

That is, data to be used for ink discharge by the nozzle A is used by the nozzle B, and data to be used for ink discharge by the nozzle B is used by the nozzle A.

More specifically, the nozzle order change unit 1125 is constructed by a RAM or selector and rearranges bitmap data in accordance with the detection result from the deviation detection unit 1121 such that the positions of dots formed by discharged ink droplets do not reverse.

For example, when a RAM is used, the RAM needs to have a capacity for storing print data of at least N dots or more, and bitmap data is serially written in the RAM in units of dots. Upon writing the data, the print data are exchanged by changing the write addresses. Alternatively, in a case where the data is exchanged upon reading the print data, bitmap data of N+2 dots are written (can be written at once), and the data are exchanged by changing the read addresses. Hence, the output from the nozzle order change unit 1125 is a serial output.

In a case where data exchange is realized using a selector, for example, if the data exchange is limited within the range of adjacent dots, N 3-input, 1-output selectors are necessary. In this case, the input/output to/from the nozzle order change unit 1125 is a parallel input/output. In a case where a serial input/output to/from the nozzle order change unit 1125 is desirable, for example, if the data exchange is limited within the range of adjacent dots, two flip-flops and one 3-input, 1-output selector are necessary.

Since dots at two ends of a given pass and dots at two ends of the precedent pass and the subsequent pass are adjacent to each other, data constructing these adjacent dots need also be exchanged. Since such data exchange is taken into consideration, a printing buffer 1113' of this embodiment has a memory capacity larger than that of the printing buffer 1113 of the third and fourth embodiments to store print data corresponding to two extra-nozzles. The printing buffer needs a capacity for storing bitmap data corresponding to one scanning+paper feed amount+two lines.

A buffer control unit 1112 controls the printing buffer 1113' to input bitmap data corresponding to N+2 nozzles in the nozzle array direction of the printhead in the nozzle order change unit 1125. On the basis of the deviation detection result obtained by the deviation detection unit 1121, the nozzle order change unit 1125 determines the nozzle allocation order and changes the order of print data in accordance with the determination result. The deviation detection unit 1121 also corrects the deviated amount in accordance with the change in nozzle allocation order (change in arrangement of print data).

For example, assume that the nozzles of the printhead are arranged in the vertical direction. To print using a nozzle immediately above the original nozzle, an amount corresponding to the nozzle pitch (moving amount) is subtracted from the deviated amount in the nozzle array direction. On the other hand, to print using a nozzle immediately below the original nozzle, an amount corresponding to the nozzle pitch (moving amount) is added to the deviated amount in the nozzle array direction.

In this embodiment, data in the nozzle array direction of the printhead are exchanged. For deviation in the printhead moving direction, data are exchanged in the moving direction.

According to the above-described embodiment, when the deviated amount of each nozzle of the printhead exceeds the nozzle pitch, print data to be bitmapped can be exchanged and printed. Hence, even if the deviated amount is large, high-quality printing can be realized.

Since such high-quality image printing can be realized without increasing the number of passes for multipass printing, a high printing speed can be maintained.

In the embodiments described above, the droplets discharged from the printhead are ink and the liquid contained in the ink tanks is ink. However, the liquids accommodated are not limited to ink. For example, the ink tanks may contain a processed liquid discharged onto the printing medium to enhance the fixation and water repellancy of the image printed on the printing medium and to improve the quality of the image.

Each of the embodiments described above has exemplified a printer, which comprises means (e.g., an electrothermal transducer, laser beam generator, and the like) for generating heat energy as energy utilized upon execution of ink discharge, and causes a change in state of an ink by the heat energy, among the ink-jet printers. According to this ink-jet printer and printing method, a high-density, high-precision printing operation can be attained.

As the typical arrangement and principle of the ink-jet printing system, a system that uses the basic principle disclosed in, for example, U.S. Pat. Nos. 4,723,129 and 4,740,796 is preferable. The above system is applicable to either one of a so-called on-demand type and a continuous type. Particularly, in the case of the on-demand type, the system is effective because, by applying at least one driving signal, which corresponds to printing information and gives a rapid temperature rise exceeding nucleate boiling, to each of electrothermal transducers arranged in correspondence with a sheet or liquid channels holding a liquid (ink), heat energy is generated by the electrothermal transducer to effect film boiling on the heat acting surface of the printhead, and consequently, a bubble can be formed in the liquid (ink) in one-to-one correspondence with the driving signal. By discharging the liquid (ink) through a discharge opening by growth and shrinkage of the bubble, at least one droplet is formed. If the driving signal is applied as a pulse signal, the growth and shrinkage of the bubble can be attained instantly and adequately to achieve discharge of the liquid (ink) with particularly high response characteristics.

As the pulse driving signal, signals disclosed in U.S. Pat. Nos. 4,463,359 and 4,345,262 are suitable. Note that further excellent printing can be performed by using the conditions described in U.S. Pat. No. 4,313,124 of the invention which relates to the temperature rise rate of the heat acting surface.

As an arrangement of the printhead, in addition to the arrangement as a combination of discharge nozzles, liquid channels, and electrothermal transducers (linear liquid channels or right angle liquid channels) as disclosed in the above specifications, the arrangement using U.S. Pat. Nos. 4,558,333 and 4,459,600, which disclose the arrangement having a heat acting portion arranged in a flexed region is also included in the present invention. In addition, the present invention can be effectively applied to an arrangement based on Japanese Patent Laid-Open No. 59-123670 which discloses the arrangement using a slot common to a plurality of electrothermal transducers as a discharge portion of the electrothermal transducers, or Japanese Patent Laid-Open No. 59-138461 which discloses the arrangement having an opening for absorbing a pressure wave of heat energy in correspondence with a discharge portion.

Furthermore, as a full line type printhead having a length corresponding to the width of a maximum printing medium which can be printed by the printer, either the arrangement which satisfies the full-line length by combining a plurality of printheads as disclosed in the above specification or the arrangement as a single printhead obtained by forming printheads integrally can be used.

In addition, not only a cartridge type printhead in which an ink tank is integrally arranged on the printhead itself but also an exchangeable chip type printhead, as described in the above embodiment, which can be electrically connected to the apparatus main unit and can receive an ink from the apparatus main unit upon being mounted on the apparatus main unit can be applicable to the present invention.

It is preferable to add recovery means for the printhead, preliminary auxiliary means, and the like provided as an arrangement of the printer of the present invention since the printing operation can be further stabilized. Examples of such means include, for the printhead, capping means, cleaning means, pressurization or suction means, and preliminary heating means using electrothermal transducers, another heating element, or a combination thereof. It is also effective for stable printing to provide a preliminary discharge mode which performs discharge independently of printing.

Furthermore, as a printing mode of the printer, not only a printing mode using only a primary color such as black or the like, but also at least one of a multi-color mode using a plurality of different colors or a full-color mode achieved by color mixing can be implemented in the printer either by using an integrated printhead or by combining a plurality of printheads.

Moreover, in each of the above-mentioned embodiments of the present invention, it is assumed that the ink is a liquid.

Alternatively, the present invention may employ an ink which is solid at room temperature or less and softens or liquefies at room temperature, or an ink which liquefies upon application of a use printing signal, since it is a general practice to perform temperature control of the ink itself within a range from 30° C. to 70° C. in the ink-jet system, so that the ink viscosity can fall within a stable discharge range.

In addition, in order to prevent a temperature rise caused by heat energy by positively utilizing it as energy for causing a change in state of the ink from a solid state to a liquid state, or to prevent evaporation of the ink, an ink which is solid in a non-use state and liquefies upon heating may be used. In any case, an ink which liquefies upon application of heat energy according to a printing signal and is discharged in a liquid state, an ink which begins to solidify when it reaches a printing medium, or the like, is applicable to the present invention. In this case, an ink may be situated opposite electrothermal transducers while being held in a liquid or solid state in recess portions of a porous sheet or through-holes, as described in Japanese Patent Laid-Open No. 54-56847 or 60-71260. In the present invention, the above-mentioned film boiling method is most effective for the above-mentioned inks.

In addition, the ink-jet printer of the present invention may be used in the form of a copying machine combined with a reader, and the like, or a facsimile apparatus having a transmission/reception function in addition to an image output terminal of an information processing equipment such as a computer.

Further, the object of the present invention can be also achieved by providing a storage medium (or recording medium) storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments being realized by executing the program codes which are read by a computer, the present invention includes a case where an OS (operating system) or the like working on the computer performs a part of or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

As many apparently widely different embodiments of the present invention can be made without departing from the spirit and scope thereof, it is to be understood that the invention is not limited to the specific embodiments thereof except as defined in the appended claims.

What is claimed is:

1. A printing method of printing data on a printing medium under multipass printing control of a printhead having a plurality of printing elements, comprising:

a generation step of generating a shading-corrected mask pattern for the multipass printing control in consideration of characteristics of each printing element of said printhead;

a setting step of setting a size of the mask pattern in a conveyance direction of the printing medium to be an integer multiple of a conveyance amount of the printing medium per scanning of said printhead; and a printing step of applying the mask pattern to image data, transferring the masked image data to said printhead, and printing.

2. The method according to claim 1, wherein the image data is data obtained by binarizing multivalued density data.

3. The method according to claim 2, wherein said generation step generates a plurality of mask patterns in accordance with a density range of the multivalued density data.

4. The method according to claim 3, further comprising a selection step of selecting one of the plurality of mask patterns in accordance with the density range of the multivalued density data.

5. The method according to claim 1, wherein said generation step, in units of printing elements of said printhead, inputs density data, performs correction so that a relationship between the input density data and an output density obtained from said printhead by actual printing becomes linear, and generates the mask pattern on the basis of the correction.

6. A printing method of printing data on a printing medium under multipass printing control of a printhead having a plurality of printing elements, comprising:

a generation step of, in units of printing elements of said printhead, inputting data indicating a position of said printhead along a moving direction of said printhead and quantized data, and generating a conversion table used for outputting a shading-corrected dot pattern in consideration of characteristics of each printing element of said printhead;

a setting step of setting a size of the conversion table in a conveyance direction of the printing medium to be an integer multiple of a conveyance amount of the printing medium per scanning of said printhead; and a printing step of inputting quantized data which has undergone pseudo-halftoning to the conversion table to convert the quantized data, transferring the converted quantized data to said printhead, and printing.

7. The method according to claim 6, wherein the pseudo-halftoning includes error diffusion processing.

8. The method according to claim 6, wherein said generation step, in units of printing elements of said printhead, inputs density data, performs correction so that a relationship between the input density data and an output density obtained from said printhead by actual printing becomes linear, and generates the conversion table on the basis of the correction.

9. A printing apparatus for printing data on a printing medium under multipass printing control of a printhead having a plurality of printing elements, comprising:

generation means for generating a shading-corrected mask pattern for the multipass printing control in consideration of characteristics of each printing element of said printhead;

setting means for setting a size of the mask pattern in a conveyance direction of the printing medium to be an integer multiple of a conveyance amount of the printing medium per scanning of said printhead; and printing means for applying the mask pattern to image data, transferring the masked image data to said printhead, and printing.

10. The apparatus according to claim 9, wherein said printhead is an ink-jet printhead for discharging ink for printing.

11. The apparatus according to claim 10, wherein said ink-jet printhead comprises an electrothermal transducer for generating thermal energy to be given to ink to discharge the ink using the thermal energy.

12. A printing apparatus for printing data on a printing medium under multipass printing control of a printhead having a plurality of printing elements, comprising:

generation means for, in units of printing elements of said printhead, inputting data indicating a position of said printhead along a moving direction of said printhead and quantized data, and generating a conversion table used for outputting a shading-corrected dot pattern in consideration of characteristics of each printing element of said printhead;

setting means for setting a size of the conversion table in a conveyance direction of the printing medium to be an integer multiple of a conveyance amount of the printing medium in each scanning cycle of said printhead; and printing means for inputting quantized data which has undergone pseudo-halftoning to the conversion table to convert the quantized data, transferring the converted quantized data to said printhead, and printing.

13. The apparatus according to claim 12, wherein said printhead is an ink-jet printhead for discharging ink for printing.

14. The apparatus according to claim 13, wherein said printhead comprises an electrothermal transducer for generating thermal energy to be given to ink to discharge the ink using the thermal energy.

15. A printing method of printing data on a printing medium by multipass printing while scanning, in a direction perpendicular to a conveyance direction of the printing medium, a printhead having a plurality of printing elements arrayed in the conveyance direction, comprising:

a setting step of setting a size of a mask pattern, in the conveyance direction, for masking print data in accordance with each pass printing of the multipass printing to be equivalent to the number of said plurality of printing elements arrayed on said printhead; and a division step of dividing the mask pattern for each pass printing, and using the divided mask pattern.

16. The method according to claim 15, wherein said printhead is an ink-jet printhead, and further comprising a detection step of detecting, in units of said plurality of printing elements, an error of a position of a dot printed on the printing medium by an ink droplet discharged from said ink-jet printhead, and wherein printing is performed using the mask pattern generated such that a printing element with a small error is frequently used in accordance with a detection result obtained in said detection step.

17. The method according to claim 16, wherein the mask pattern is formed using a lookup table format, and further comprising an update step of updating contents of the lookup table in accordance with the detection result obtained in said detection step.

18. The method according to claim 16, wherein the error includes an error in the conveyance direction of the printing medium, an error in a scanning direction of said printhead, or errors in the conveyance direction of the printing medium and in the scanning direction of said printhead.

19. The method according to claim 16, further comprising an exchange step of exchanging positions of print data in accordance with the detection result obtained in said detection step.

20. The method according to claim 19, wherein the exchange step includes exchanging the position of the print data in the conveyance direction of the printing medium, exchanging the position of the print data in the scanning direction of said printhead, or exchanging the positions of the print data in the conveyance direction of the printing medium and in a scanning direction of said printhead.

21. The method according to claim 16, wherein said ink-jet printhead comprises an electrothermal transducer for generating thermal energy to be given to ink to discharge the ink using the thermal energy.

22. A printing apparatus comprising:

conveyance means for conveying a printing medium;

an ink-jet printhead having a plurality of printing elements arrayed in a conveyance direction of the printing medium;

scanning means for reciprocally scanning said ink-jet printhead;

a printing buffer for temporarily storing print data; and control means for controlling to print the data on the printing medium on the basis of the print data stored in said printing buffer using said ink-jet printhead by multipass printing using a mask pattern for masking the print data in accordance with each pass printing, wherein a size of the mask pattern in the conveyance direction is set to be equivalent to the number of said plurality of printing elements arrayed on said printhead, and the mask pattern is dividedly used for each pass printing.

23. The apparatus according to claim 22, further comprising detection means for detecting, in units of said plurality of printing elements, an error of a position of a dot printed on the printing medium by an ink droplet discharged from said ink-jet printhead, wherein printing is performed using the mask pattern generated such that a printing element with a small error is frequently used in accordance with a detection result obtained by said detection means.

24. The apparatus according to claim 23, wherein the mask pattern is formed using a lookup table format, and further comprising update means for updating contents of the lookup table in accordance with the detection result obtained by said detection means.

25. The apparatus according to claim 23, wherein the error includes an error in the conveyance direction of the printing medium, an error in a scanning direction of said printhead, or errors in the conveyance direction of the printing medium and in the scanning direction of said printhead.

26. The apparatus according to claim 23, further comprising exchange means for exchanging positions of print data in accordance with the detection result obtained by said detection means.

27. The apparatus according to claim 26, wherein the exchange includes exchanging the position of the print data in the conveyance direction of the printing medium, exchanging the position of the print data in the scanning direction of said printhead, or exchanging the positions of the print data in the conveyance direction of the printing medium and in the scanning direction of said printhead.

28. The apparatus according to claim 22, wherein said ink-jet printhead comprises an electrothermal transducer for generating thermal energy to be given to ink to discharge the ink using the thermal energy.

29. A printing method of printing an image on a printing medium by using a printhead having a plurality of printing elements, comprising the steps of:

inputting multi-valued density data corresponding to each of said plurality of printing elements;

quantizing the inputted multi-valued density data, based on a quantized level corresponding to each of said plurality of printing elements; and printing by driving said plurality of printing elements, based on the quantized data, wherein the quantized level is corrected, based on correction data corresponding to a printing characteristic of each of said plurality of printing elements.

30. The method according to claim 29, wherein the quantized level is stored in a look-up table.

31. The method according to claim 29, wherein the quantized data is corrected by shading data for correcting the printing characteristic of each of said plurality of printing elements.

32. The method according to claim 29, wherein said printhead is an ink-jet printhead for printing by discharging ink.

33. The method according to claim 32, wherein said ink-jet printhead comprises an electrothermal transducer for generating thermal energy to be given to ink to discharge the ink using the thermal energy.

34. An image processing apparatus for processing image data to be inputted into a printing apparatus for printing an image on a printing medium by using a printhead having a plurality of printing elements, comprising:

input means for inputting multi-valued density data corresponding to each of said plurality of printing elements;

a table for storing a quantization level corresponding to each of said plurality of printing elements;

correction means for correcting the quantization level stored in said table, based on shading data for correcting a printing characteristic of each of said plurality of printing elements; and quantization means for quantizing the multi-valued density data inputted by said input means, based on the quantized level corrected by said correction means.

35. The apparatus according to claim 34, wherein said printhead is an ink-jet printhead for printing by discharging ink.

36. The apparatus according to claim 35, wherein said ink-jet printhead comprises an electrothermal transducer for generating thermal energy to be given to ink to discharge the ink using the thermal energy.

* * * * *